United States Patent
Calin et al.

(10) Patent No.: US 9,191,956 B2
(45) Date of Patent: Nov. 17, 2015

(54) METHOD AND APPARATUS FOR WIRELESS SYSTEM CONTROL TO ENABLE PROVISION OF HIGH CAPACITY IN AREAS WITH HIGH CONCENTRATION OF WIRELESS USER DEVICES

(75) Inventors: Doru Calin, Manalapan (FR); Aliye Ozge Kaya, Chatham, NJ (US); Kai Yang, Belle Mead, NJ (US); Simon Yiu, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 374 days.

(21) Appl. No.: 13/539,303

(22) Filed: Jun. 30, 2012

(65) Prior Publication Data

US 2013/0225216 A1  Aug. 29, 2013

Related U.S. Application Data

(60) Provisional application No. 61/603,361, filed on Feb. 26, 2012.

(51) Int. Cl.
| | |
|---|---|
| H04B 15/00 | (2006.01) |
| H04W 72/04 | (2009.01) |
| H04W 24/02 | (2009.01) |

(52) U.S. Cl.
CPC ............ *H04W 72/046* (2013.01); *H04W 24/02* (2013.01)

(58) Field of Classification Search
CPC ....... H04W 24/08; H04W 28/04; H04W 4/22; H04W 72/082; H04W 76/007; H04W 84/12; H04W 8/08; H04W 24/02; H04W 72/046; H04Q 3/0091; H04Q 3/54525

USPC ............. 455/501, 133, 422.1, 447, 453, 509, 455/517, 522, 562.1; 370/229, 252, 347
See application file for complete search history.

(56) References Cited

U.S. PATENT DOCUMENTS

| | | | |
|---|---|---|---|
| 6,400,335 B1 | 6/2002 | Weaver et al. | |
| 2005/0250503 A1* | 11/2005 | Cutrer | 455/447 |

(Continued)

FOREIGN PATENT DOCUMENTS

| | | |
|---|---|---|
| EP | 1617598 A1 | 1/2006 |
| JP | 2002118511 A | 4/2002 |

(Continued)

OTHER PUBLICATIONS

Louai Saker et al: "Minimizing Energy Consumption via Sleep Mode in Green Base Station", Wireless Communications and Networking Conference (WCNC), 2010 IEEE, Piscataway, NJ, USA, Apr. 18, 2010 pp. 1-6, XP031706438 ISBN: 978-1-4244-6396-1—abstract—chapter I, chapter II.B, chapter V.

(Continued)

*Primary Examiner* — Shaima Q Aminzay
(74) *Attorney, Agent, or Firm* — Mendelsohn, Drucker & Dunleavy, P.C.; Yuri Gruzdkov

(57) ABSTRACT

An example system includes a plurality of wireless communication elements and a controller. The plurality of wireless communication elements are configured to provide wireless service to a geographic area of interest, each wireless communication element comprising at least an antenna port or at least one antenna. The controller is configured to control the wireless communication elements, wherein the controller is configured to determine respective ones of the wireless communication elements that are to be activated or not activated.

19 Claims, 20 Drawing Sheets

(56) References Cited

U.S. PATENT DOCUMENTS

| | | | |
|---|---|---|---|
| 2006/0009208 A1* | 1/2006 | Jang et al. | 455/422.1 |
| 2009/0247067 A1 | 10/2009 | Li et al. | |
| 2010/0069122 A1 | 3/2010 | Ito | |
| 2011/0096687 A1* | 4/2011 | Dottling et al. | 370/252 |
| 2012/0315948 A1* | 12/2012 | Frenger et al. | 455/522 |

FOREIGN PATENT DOCUMENTS

| | | |
|---|---|---|
| JP | 2009246974 A | 10/2009 |
| JP | 2010068496 A | 3/2010 |
| WO | 2009/115554 A1 | 9/2009 |
| WO | 2011/105938 A1 | 9/2011 |

OTHER PUBLICATIONS

PCT International Search Report (PCT/US2013/027707) dated Aug. 16, 2013—4 pages.

PCT Written Opinion of the International Searching Authority (PCT/US2013/027707) dated Aug. 16, 2013—6 pages.

* cited by examiner

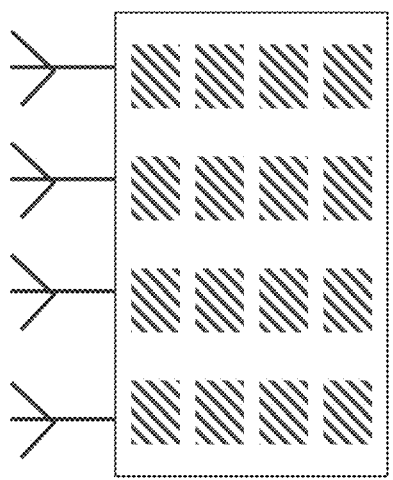
$N_{TA} = N_{RA} = 4$ (4 transmitter antenna ports and 4 receiver antenna ports)
$N_{TE} = N_{RE} = 16$ (16 antenna elements for transmitting and receiving)
Figure 11.a

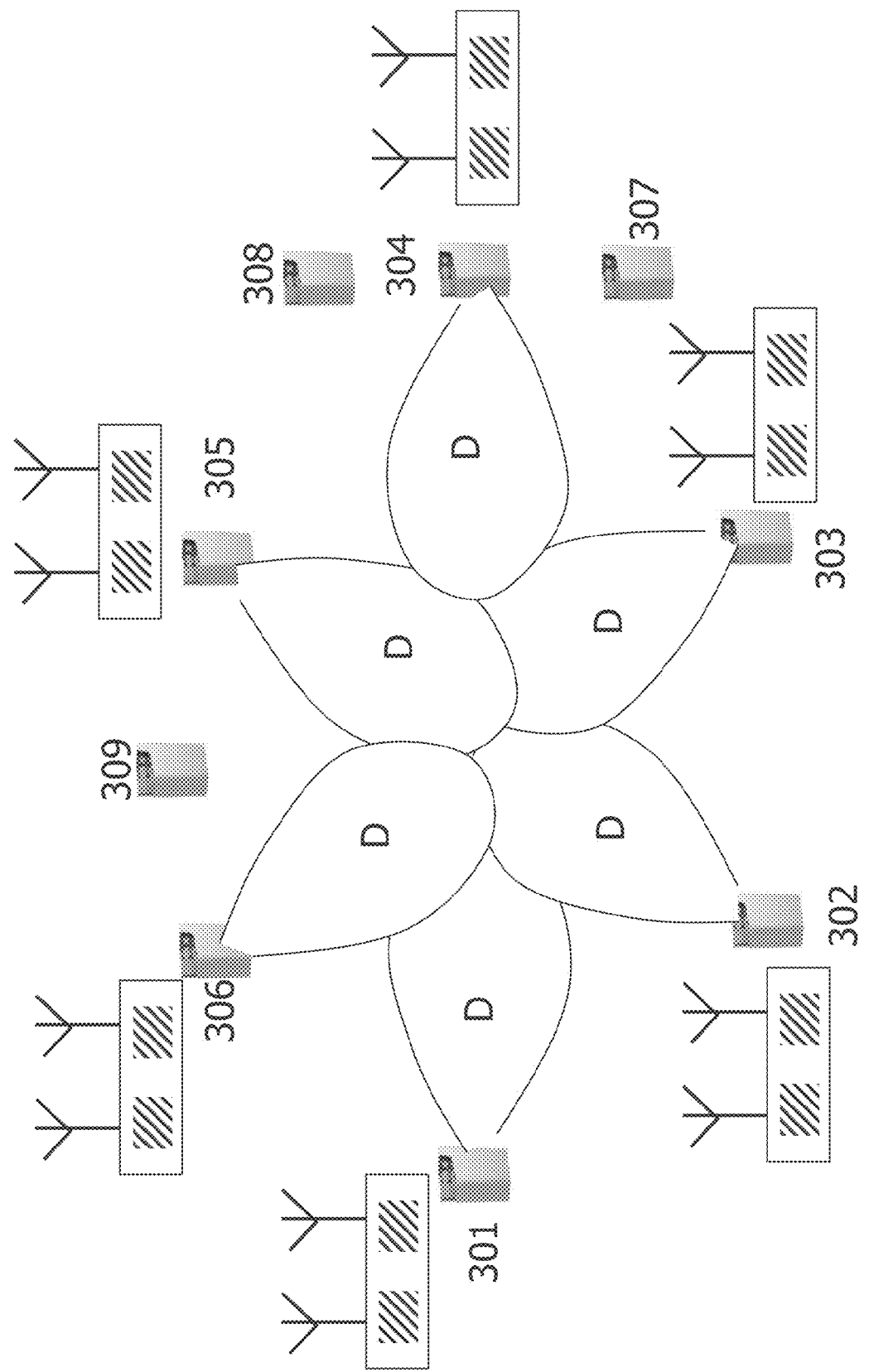
Figure 11.b

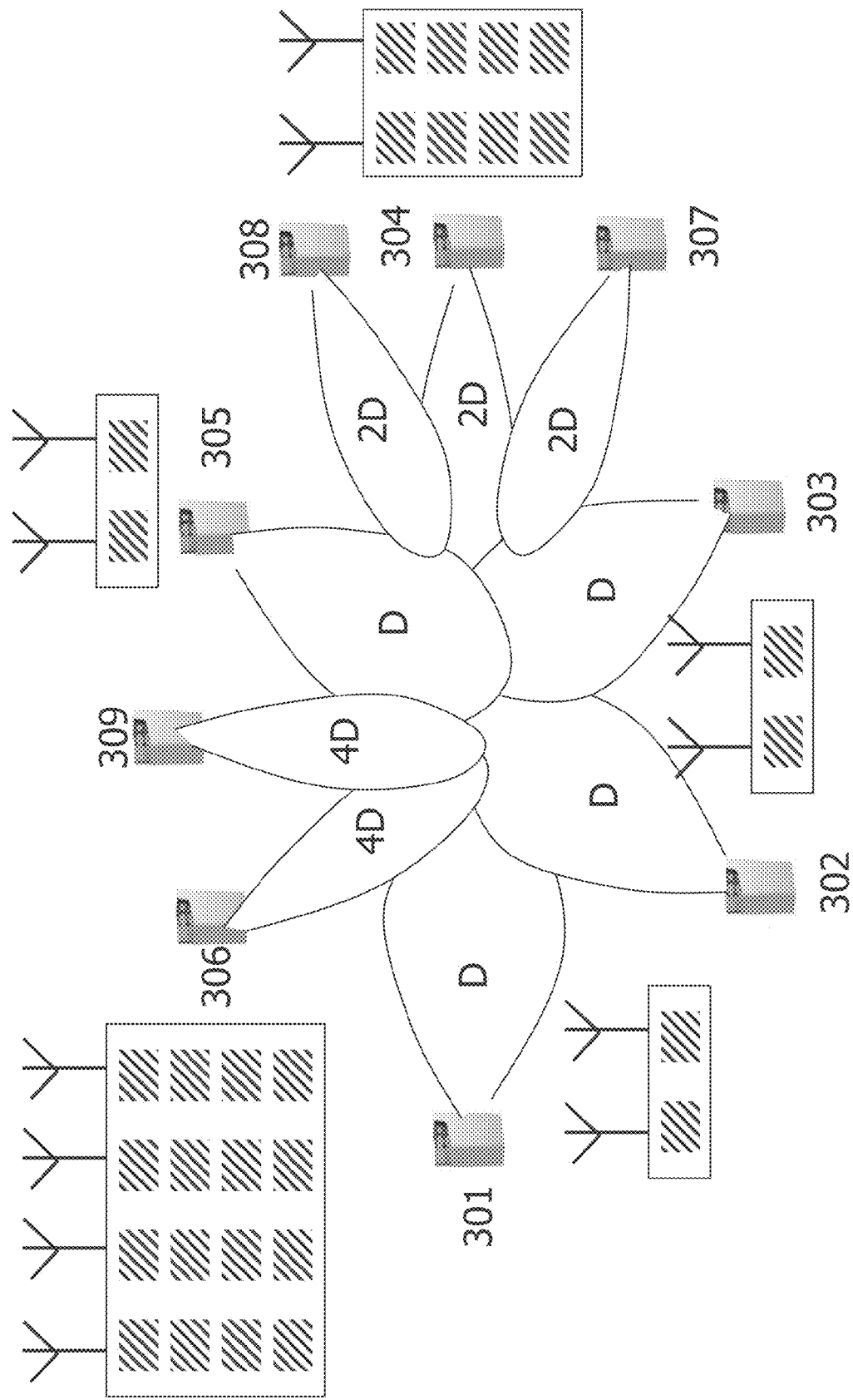

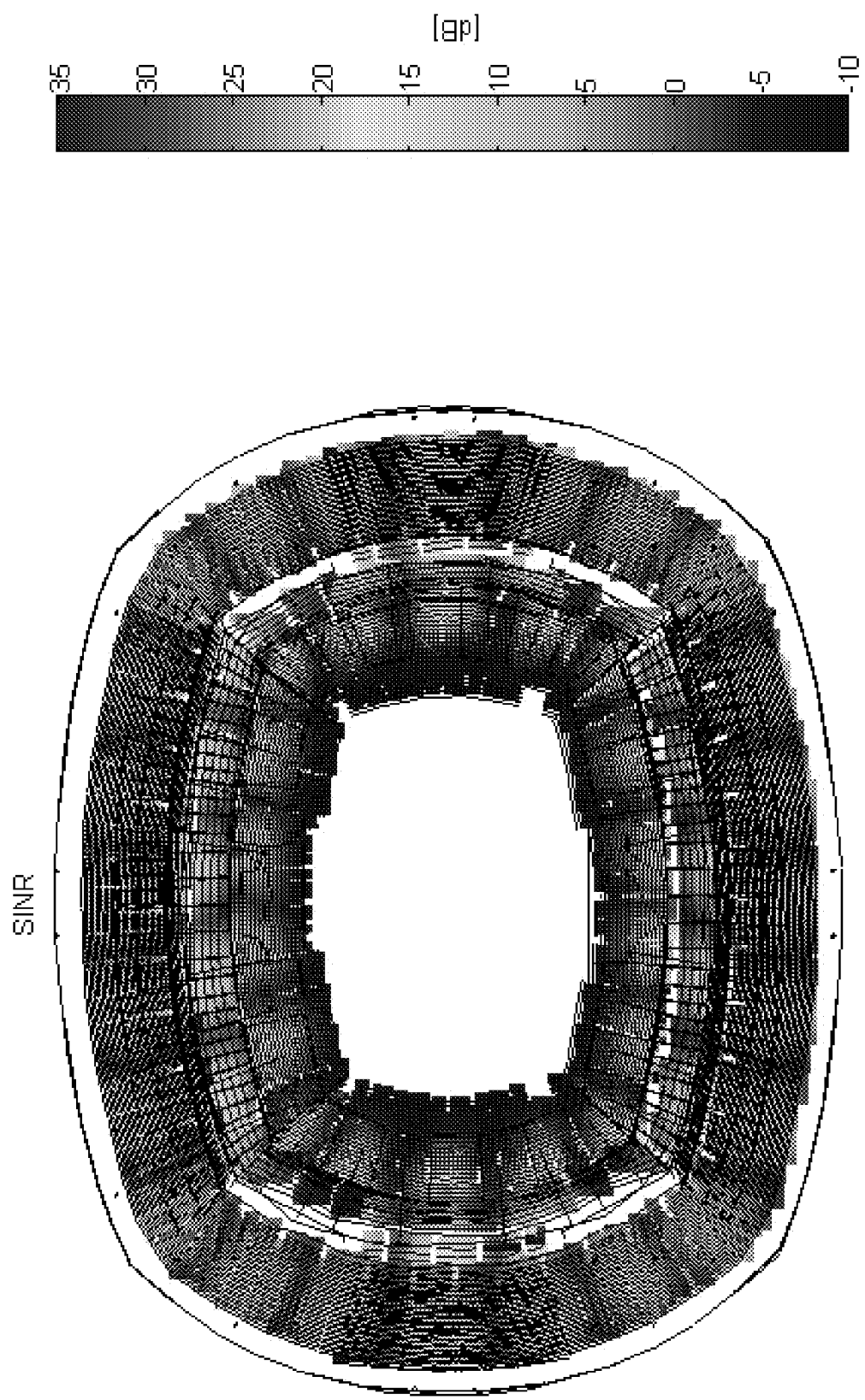
Figure 16.a

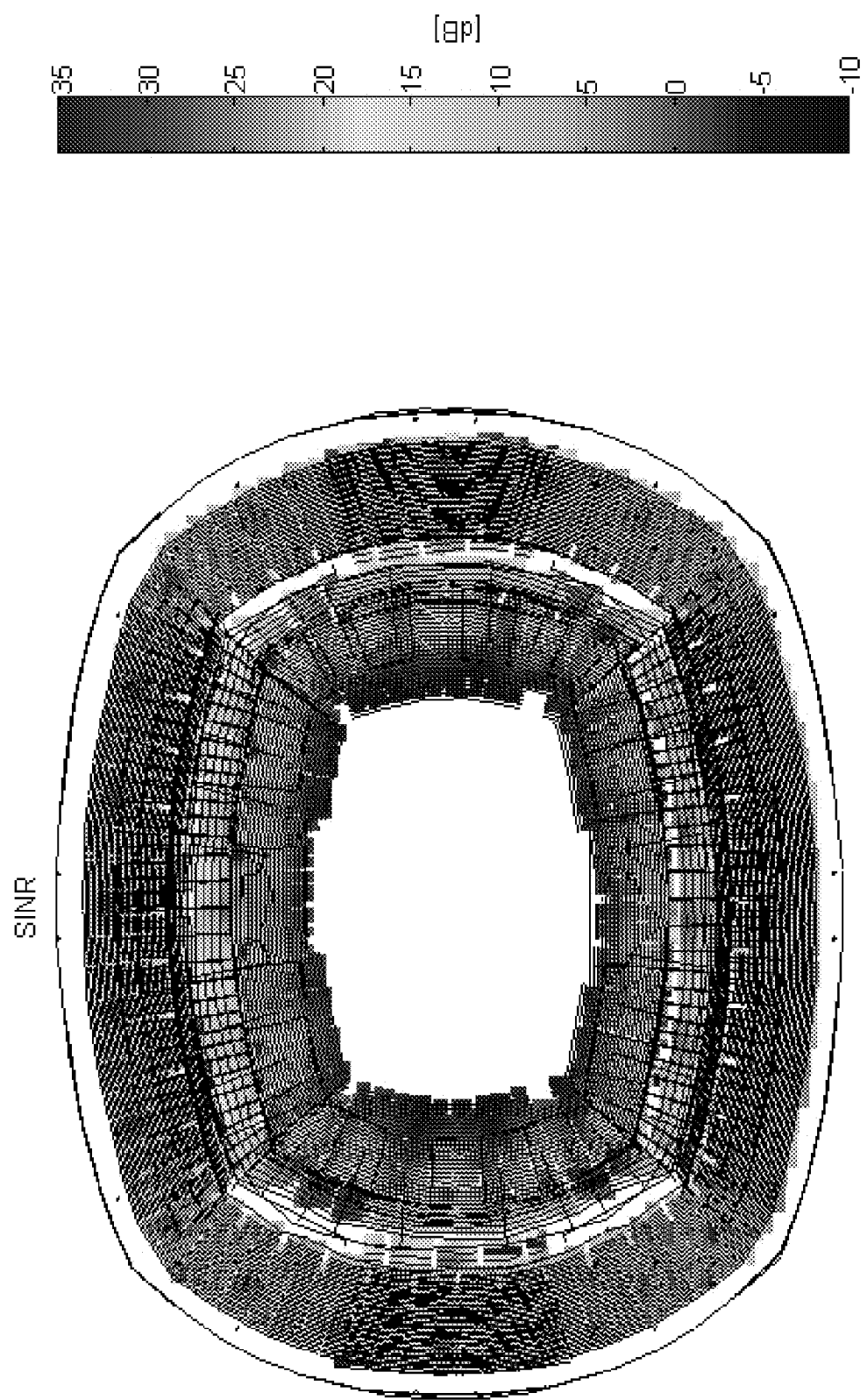
Figure 16.b

METHOD AND APPARATUS FOR WIRELESS SYSTEM CONTROL TO ENABLE PROVISION OF HIGH CAPACITY IN AREAS WITH HIGH CONCENTRATION OF WIRELESS USER DEVICES

RELATED APPLICATIONS

This application claims priority pursuant to 35 U.S.C. 119 to U.S. Provisional Application No. 61/603,361 filed Feb. 26, 2012, entitled "METHOD & APPARATUS FOR WIRELESS SYSTEM CONTROL," the subject matter thereof being fully incorporated herein by reference.

FIELD OF INVENTION

The invention(s) relate to communication equipment and, more specifically but not exclusively, to equipment for providing wireless communication services to a geographic area of interest.

DESCRIPTION OF THE RELATED ART

This section introduces aspects that may help facilitate a better understanding of the invention(s). Accordingly, the statements of this section are to be read in this light and are not to be understood as admissions about what is in the prior art or what is not in the prior art.

High capacity wireless communication services is needed in hot spot traffic scenarios. Such scenarios can be encountered in day-to-day life in sport arenas, at popular sport events, in crowded areas such as malls or business centers or at any location where large numbers of wireless devices demand wireless service. The demand for capacity can be very severe, as a large number of users (e.g., several thousands of user devices) may be crowded in a relatively small space (e.g., approximately 300 m×250 m in case of a stadium) and may attempt to obtain service and/or be served simultaneously.

Currently wireless Operators use a blending of solutions to address this high capacity problem: traditional macro-networks, WiFi and Distributed Antenna Systems (DAS) may be used in complement of each other to increase the total available capacity in hot spot traffic scenarios. DAS improves the coverage through a "long antenna concept". Nevertheless, in terms of capacity, a DAS system is still limited to the capacity that can be offered by a sector of a macro Base Station (BS) (as illustrated in FIG. 1), which limits its potential to scale in capacity with heavy traffic demands. FIG. 1 illustrates a DAS system with antennas 35, the capacity of which is limited to the throughput of one (1) sector of a Base Transceiver Station (BTS) 20 which is supplied by Core Network 10.

SUMMARY

In one embodiment, a system comprises a plurality of wireless communication elements for providing wireless service to a geographic area of interest, each wireless communication element comprising at least an antenna port or at least one antenna; and a controller for controlling the wireless communication elements, wherein the controller is configured to determine respective ones of the wireless communication elements that are to be activated or not activated. The wireless communication elements can be transmitters, receivers, or transceivers.

In one embodiment, the controller is configured to determine the respective ones of the wireless communication elements that are to be activated or not activated based on traffic density of the geographic area of interest.

In one embodiment, one or more of the plurality of wireless communication elements includes a plurality of antenna ports; and the controller is configured to determine respective ones of the plurality of antenna ports of a respective wireless communication element that are to be activated or not activated.

In one embodiment, the at least one antenna port of one or more of the plurality of wireless communication elements includes at least one antenna element; and the controller is configured to determine respective ones of the at least one antenna element of a respective wireless communication element that are to be activated or not activated.

In one embodiment, the controller is configured to change an activation state of at least one of a number of wireless communication elements, a number of antenna ports, a number of antenna elements, or a combination thereof when the controller determines a change in traffic density of the geographic area of interest. The controller can be configured to change from an inactive state to an active state at least one of a number of wireless communication elements, a number of antenna ports, a number of antenna elements, or a combination thereof when the controller determines a change in traffic density of the geographic area of interest. The controller can be configured to activate at least one of an increased number of wireless communication elements, an increased number of antenna ports, an increased number of antenna elements, or a combination thereof when the controller determines a change in traffic density of the geographic area of interest. The controller can be configured to render inactive at least one of a number of communication elements, a number of antenna ports, a number of antenna elements, or a combination thereof when the controller determines a change in traffic density of the geographic area of interest. The controller can be configured to render inactive at least one of a decreased number of communication elements, a decreased number of antenna ports, a decreased number of antenna elements, or a combination thereof when the controller determines a change in traffic density of the geographic area of interest.

In one embodiment, controller is configured to control of at least one of amplitude and phase of the at least one antenna element of a respective wireless communication element such that the controller is able to adjust a radiating pattern of the wireless communication element. The controller may be a centralized controller. The controller may be a distributed controller with portions of the controller distributed among subsets of the plurality of wireless communication elements, a respective portion of the distributed controller for controlling a respective subset of the plurality of wireless communication elements.

In one embodiment, the controller is configured to coordinate future configuration information (i.e., set one or more of settings, parameters, statuses and the like) for at least one of a subset of the wireless communication elements, a subset of the at least one antenna ports of a respective wireless communication element, a subset of the antenna elements of a respective wireless communication element or a combination thereof based on configuration information for the wireless communication elements in the subset.

In one embodiment, one or more subsets of the plurality of wireless communication elements are configured to exchange information concerning a configuration for the wireless communication elements within a respective subset. The configuration information may comprise one or more of wireless communication element activation status, antenna port activation status, antenna element activation status, design element information, power level setting information, antenna pattern setting information, antenna orientation setting information, and information concerning resources in use by a first wireless communication element.

In one embodiment, the plurality of wireless communication elements are configured to utilize mechanisms for mitigating inter-wireless communication element interference. In one embodiment, the plurality of wireless communication elements are configured to utilize Radio Frequency (RF) carrier reuse for mitigating inter-wireless communication element interference. In one embodiment, the plurality of wireless communication elements are configured to support at least one of RF carrier reuse 1, RF carrier reuse 2, RF carrier reuse 3, RF carrier reuse 6, and RF carrier reuse 12.

In one embodiment, the plurality of wireless communication elements are configured in one or more tiers around a periphery of a circumference of the geographic area of interest, each tier including a subset of the plurality of wireless communication elements, the wireless communication elements of adjacent tiers separated by a vertical distance. In one embodiment, a front face of the at least one antenna of at least one of the plurality of wireless communication elements is deployed facing approximately straight down to the earth. In one embodiment, a front face of the at least one antenna of at least one of the plurality of wireless communication elements is deployed with an approximately 90° downtilt.

In one embodiment, one or more of the plurality of wireless communication elements includes a plurality of antennas; and the plurality of antennas of at least one of the plurality of wireless communication elements are arrayed horizontally and aligned tangentially to a tier of wireless communication elements around a periphery of a circumference of the geographic area of interest, with a main beam of one or more of the wireless communication elements configured to point radial to an interior of a space defined by the plurality of wireless communication elements.

In one embodiment, an apparatus comprises processor and an associated memory. The processor is configured to determine respective ones of a plurality of wireless communication elements for providing wireless service to a geographic area of interest that are to be activated or not activated.

In one embodiment, the processor is configured to determine the respective ones of the plurality of wireless communication elements that are to be activated or not activated based on traffic density of the geographic area of interest.

In yet another embodiment, the processor is configured to determine respective ones of a plurality of antenna of a respective wireless communication element that are to be activated or not activated.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 11.a, 11.b and 11.c illustrate through an example how a wireless communication system designed in accordance to the principles of this invention adapts to changing traffic conditions over the geographic area of interest;

FIGS. 16a and 16b show a frequency reuse example for an example stadium deployment.

To facilitate understanding, identical reference numbers have been utilized, where possible, to designate identical elements that are common to the figures.

DETAILED DESCRIPTION

Figure 1:
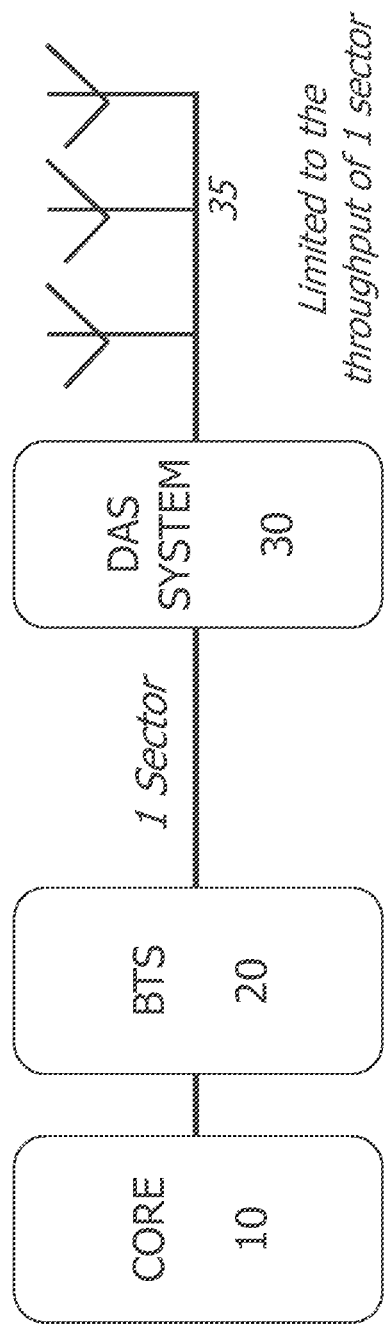
FIG. 1 is a high-level block diagram that illustrates use a prior art Distributed Antenna System (DAS) system.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling for each of understanding, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Provided herein are method, apparatus system embodiments for providing wireless communication service to user devices in a geographic area of interest. The provided embodiments enable the controlled provision of high capacity in areas where the traffic demands can be large, such as in sport arenas, stadiums, malls, and other areas of with a sufficient concentration of user devices. As used herein, the term "wireless device" or "user device" may be considered synonymous to, and may hereafter be occasionally referred to, as a client, user equipment, mobile station, mobile user, mobile, subscriber, user, remote station, access terminal, receiver, mobile unit, etc., and may describe a remote user of wireless resources in a wireless communication network.

State-of-the are solutions for providing wireless service, for example to hotspots, do not scale in capacity. Macro networks are not economically attractive. Distributed Antenna Systems (DAS) introduce just a "longer antenna", which significantly improves the coverage, but are still limited to the capacity offered by a macro-sector. WiFi are known to fall short in traffic congestion conditions. In contrast, embodiments according to the principles and teaching provided herein provide scalable capacity, where each wireless communication element (e.g., a metrocell, a LightRadio™ metrocell, a LightRadio™ Stadium Cube etc. and the like) can deliver high "local" capacity to its immediate geographical proximity. For a deployment in a stadium for example, metrocells can deliver capacity orders of magnitude higher as compared to a DAS macro sector. According to the principles of the invention, capacity of wireless communication elements, such as metrocells, can controllably scale up by simply increasing the antenna gains. As used herein, the term "wireless communication element" may be considered synonymous to, and may hereafter be occasionally referred to, as a transceiver, metrocell, and LightRadio™ Cube and may describe a transceiver in communication with and providing wireless resources to mobiles in a wireless communication network which may span multiple technology generations. In other embodiments, the wireless communication element may comprise a transmitter or receiver functionality.

A system implementing the principles of the invention includes a plurality of transceivers (N transceivers), where each transceiver is equipped with at least an antenna, and provides wireless services to a geographical area of interest. The antenna may be realized with at least one antenna element, resulting in a radiating pattern that can be controlled electronically in amplitude and phase. The system may be deployed to meet at least one quality metric, such as a coverage metric, a capacity metric and the like or some combination thereof, the quality metric over a geographical area of interest.

The system also includes either a local or a global coordination among transceivers, where local coordination implies that at least a subset of the plurality of transceivers are deployed in a coordinated manner, and global coordination implies that the plurality of transceivers are deployed in a coordinated manner. Coordination among a subset (or a group) of transceivers means that each transceiver of the subset of transceivers has a degree of awareness about the configuration of the other transceivers pertaining to the same said subset of transceivers. In one embodiment, the configuration of a transceiver refers to design elements such as power levels, antenna patterns, antenna orientation (e.g., azimuth and/or tilt), and resources in use by a transceiver. The coordination across transceivers is done either in a centralized manner from a common controller, or in a distributed manner through information exchange across the transceivers pertaining to the set of transceivers via available interfaces (e.g. via the X2 interface in LTE).

Different subsequent mechanisms to mitigate intra and inter-transceiver interference may also be supported. In various embodiments according to the principles of the invention, various forms of Radio Frequency (RF) carrier reuse may be implemented. Taking LTE as an example, a 10 MHz spectrum bandwidth can be operated either in RF carrier reuse 1 (only one 10 MHz RF carrier deployed in reuse 1 across the system), or in RF carrier reuse 2 (two 5 MHz RF carriers deployed in reuse 2 across the system) or in RF carrier reuse 3 (three 3 MHz RF carriers deployed in reuse 3 across the system) or in RF carrier reuse 6 (six 1.4 MHz RF carriers deployed in reuse 6 across the system).

A lower density of transceivers can be used in early stages of system deployments, relying on simpler antennas, that have a small number of antenna elements (e.g., a smaller number of LightRadio cubes). A higher density of transceivers can be used in more advanced stages of system deployments, relying on antennas that have a larger number of antenna elements (e.g., a larger number of LightRadio cubes).

According to one embodiment, a number of transceivers can be deployed, and for a given traffic activity in the network, at least a subset of transceivers is activated simultaneously. For lower capacity needs, a smaller number of transceivers, with a broader antenna pattern can be activated by feeding a smaller number of antenna elements (e.g., a smaller number of LightRadio cubes). For higher capacity needs, a larger number of transceivers, with a narrower antenna pattern can be activated by feeding a larger number of antenna elements (e.g., a larger number of LightRadio cubes). Hence, the system can dynamically and intelligently activate the number of transceivers and antenna patterns to meet the required quality metrics at a given time and enables the realization of capacity scaling.

In a further embodiment, the density of transceivers that are activated at a given time depends on the traffic density of the geographical area; that is, additional transceivers can be activated in areas with more traffic. Furthermore, the antenna patterns can be dynamically adapted across zones; for instance in one embodiment according to the principles of the invention, for areas with high density of transceivers, more directive antennas can be realized by feeding more antenna elements simultaneously, while for areas with low density of transceivers, less directive antennas can be realized by feeding fewer antenna elements simultaneously. Where coordination among transceivers is required, and such coordination can be either limited to a subset of transceivers (e.g., to a local neighborhood), or can be applied to the entire geographical area of interest.

Implementations of such coordination are described in the following embodiments:

A centralized controller communicates continuously or from time-to-time with the entire plurality of transceivers under its supervision. The centralized controller receives system information from at least a transceiver under its supervision. The system information may include data such as measured traffic activity and/or measured radio conditions in the proximity of the transceiver. Based on this data, the centralized controller monitors, determines and coordinates a desirable system configuration to meet the quality objectives specified. Assuming that in a possible implementation of this invention, at a given time, T1, the controller determines that only a number of M transceivers, where M is less or equal N (M<=N), shall be activated at T1. Referring to "i-th" transceiver as "TRX_i", the set of M transceivers is represented as {TRX_1, TRX_2, TRX_3, ..., TRX_M−1, TRX_M}. Furthermore, the controller determines the parameters to be used by each active transceiver at time T1. These parameters may include the radiated power used by an active transceiver, its antenna pattern, and the three dimensional orientation of its antenna pattern as described by specific azimuth and tilt settings. The antenna pattern can be shaped by feeding a specific number of antenna elements of the AAA (Active Antenna Array) antenna of the transceiver. This can be done by using appropriate amplitude and phase values for each antenna element that is activated. Thus, the configuration for TRX_i can be represented by a specific set of parameters {power_i, azimuth_i, tilt_i, number_antenna_elements_i, amplitude_element_k, phase_element_k}, where 1<=k<=number_antenna_elements_i. The configuration of each active transceiver is further implemented according to the parameters specified by the controller. This can be accomplished by informing each transceiver about its specific configuration assuming that the transceivers can reconfigure themselves, and can also be accomplished by simply reconfiguring the entire system from a control unit such as an Operation & Maintenance (O&M) unit, which has the ability to implement such system changes.

A distributed centralized architecture (as described in a following section)

A fully decentralized architecture (as described in a following section)

Figure 2:
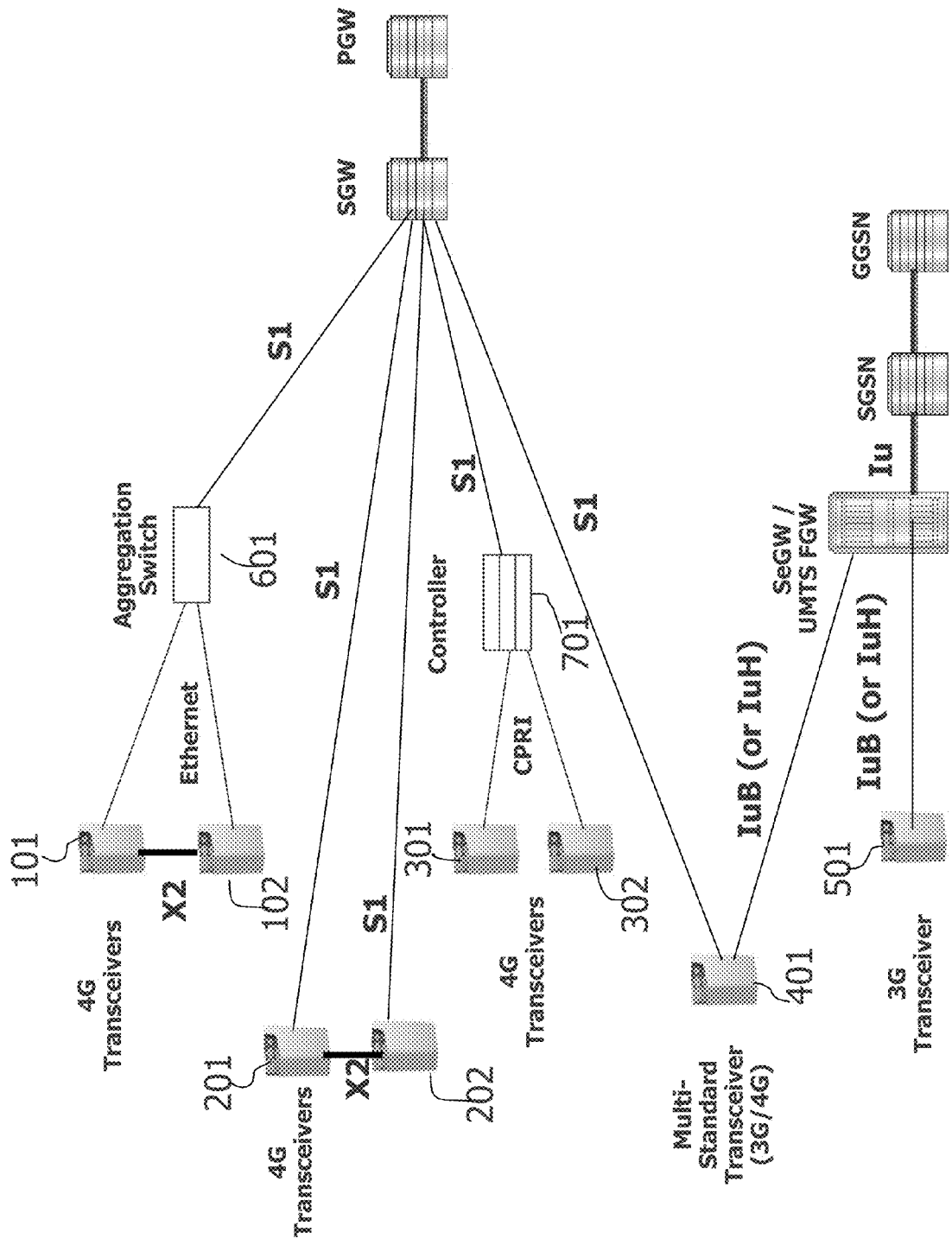
FIG. 2 is a high-level block diagram illustrating a variety of possible system architectures that are representative of embodiments according to the invention.

FIG. 2 is a high-level block diagram illustrating a variety of possible system architectures that are representative of embodiments according to the invention. Transceivers 101 and 102 (which are 4G transceivers in the illustrated representation) are connected to an aggregated switch 601, which in turn is connected to a gateway, for instance a Service GateWay (SGW), according to the Third Generation Partnership Project (3GPP) Long Term Evolution (LTE) terminology. The transceivers 101 and 102 can exchange information via an interface, e.g. X2 interface in LTE.

Transceivers 201 and 202 (which are 4G transceivers in the illustrated representation) are connected directly to a SGW. The transceivers 201 and 202 can exchange information via an interface, for example, an X2 interface in LTE.

Transceivers 301 and 302 (which are 4G transceivers in the illustrated representation) are connected to a controller and processor unit 701, which in turn is connected to a SGW. The controller and processor unit 701 coordinates the allocation of resources among transceivers 301 and 302 which are connected to it.

Transceiver 401 is a multi-standard transceiver (e.g., it is compatible with both 3G and 4G in the illustrated representation), and it is connected accordingly to a 4G SGW for the 4G traffic and to a 3G Secure Gateway (SeGW) for the 3G traffic.

Transceiver 501 (which is a 3G transceiver in the illustrated representation) is connected to a 3G Secure Gateway (SeGW), which is connected to a Serving GPRS Support Node (SGSN). The SGSN is connected to a Gateway GPRS Support Node (GGSN) which is responsible for the interworking between the GPRS network and external packet switched networks, like the Internet, X.25 networks and the like. While described in terms of transceivers which have network communication functionality for a particular networking standard, transceivers may also be call wireless communication elements herein and may have transmitter, receiver or both transmitter and receiver functionality. Transceivers 101, 102, 201, 202, 301, 302, 401 and 501 provide wireless service to suitable equipped user devices (not shown).

Figure 3:
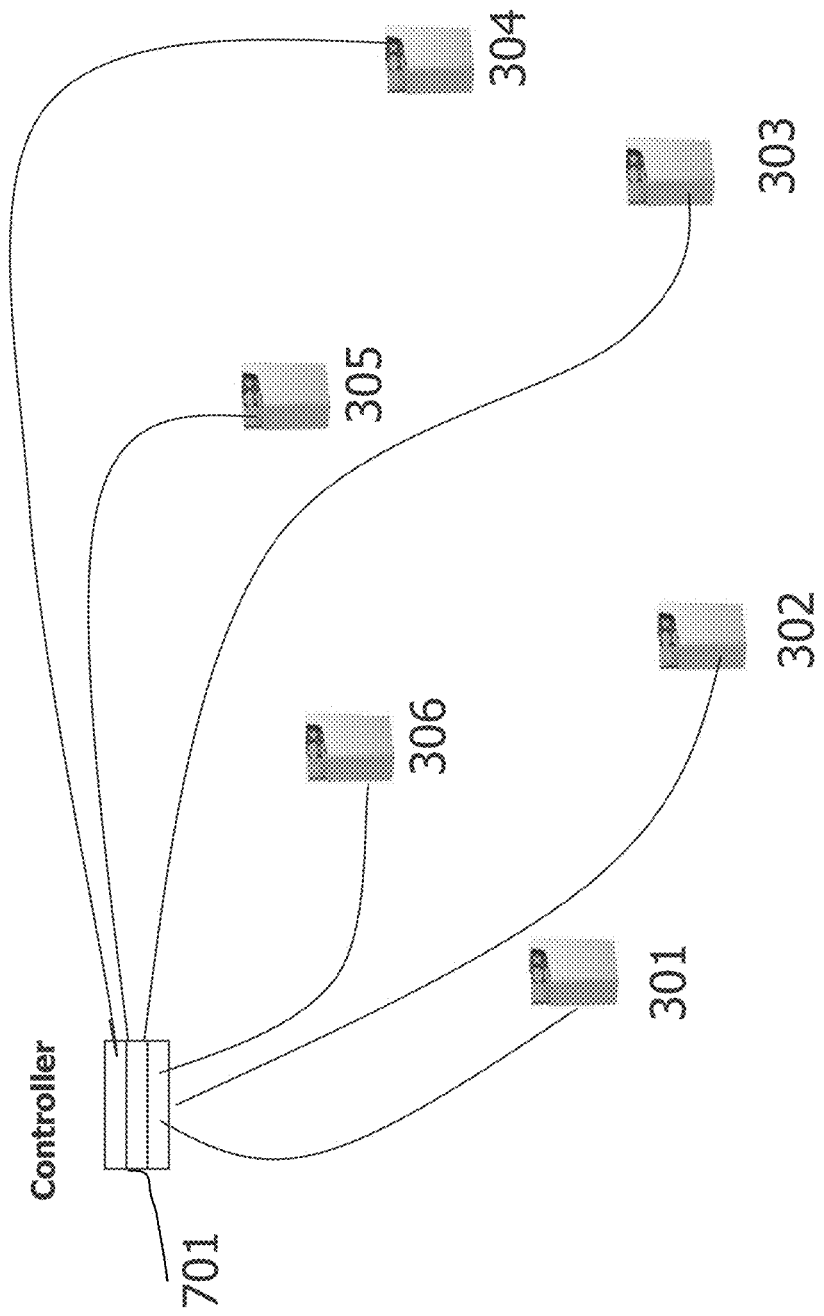
FIG. 3 is a high-level block diagram illustrating a representative embodiment according to the principles of the invention that utilizes a centralized architecture relying on a single controller and processor.

FIG. 3 is a high-level block diagram illustrating a representative embodiment according to the principles of the invention that utilizes a centralized architecture relying on a single controller and processor 701, which coordinates the operation of transceivers 301 through 306 under its supervision.

Figure 4:
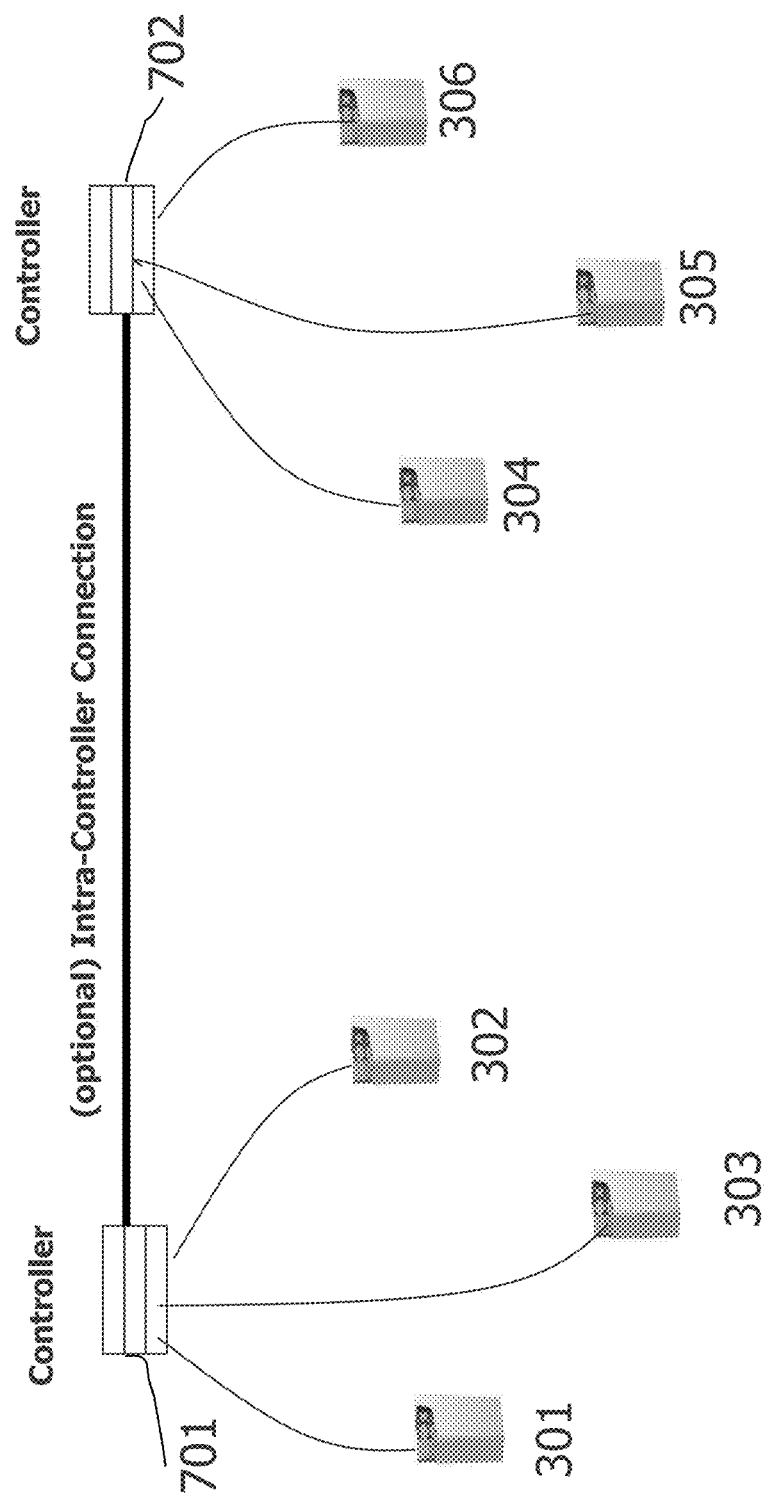
FIG. 4 is a high-level block diagram illustrating a representative embodiment according to the principles of the invention utilizing a distributed centralized architecture relying on several controllers and processors.

FIG. 4 is a high-level block diagram illustrating a representative embodiment according to the principles of the invention utilizing a distributed centralized architecture relying on several controllers and processors. Controller and processor 701 coordinates the operation of a first subset of transceivers, namely transceivers 301, 302 and 303, while controller and processor 702 coordinates the operation of a second subset of transceivers, namely transceivers 304, 305, 306. There may be further coordination between the controllers 701 and 702 via an interface connecting the controllers.

Figure 8:
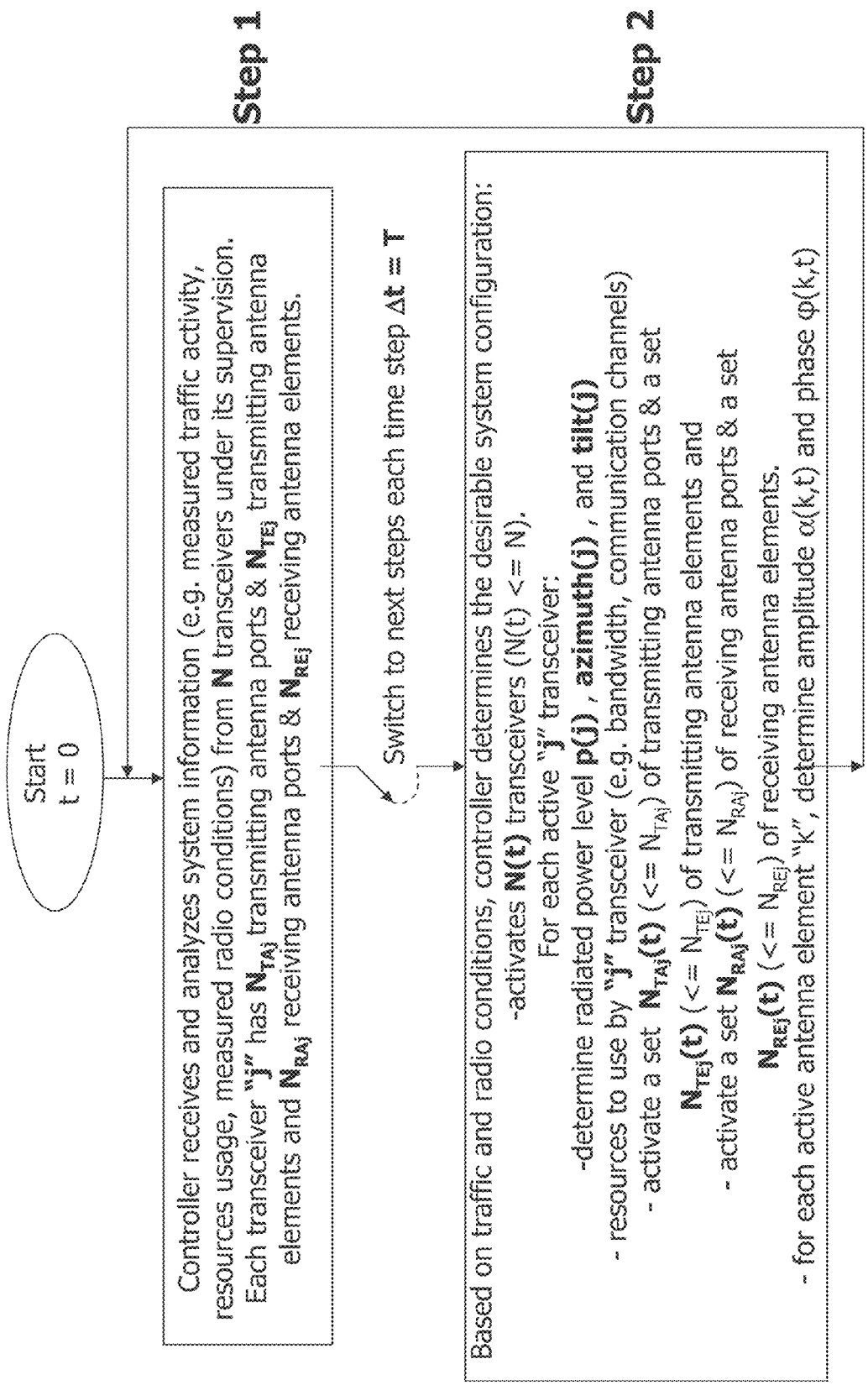
FIG. 8 is a flowchart illustrating an example method of controlling wireless communication elements that is associated with a controller of the centralized architecture embodiment of FIG. 3.

The operation of embodiments with centralized architecture embodiments is further detailed in the description related to FIG. 8.

Figure 5:
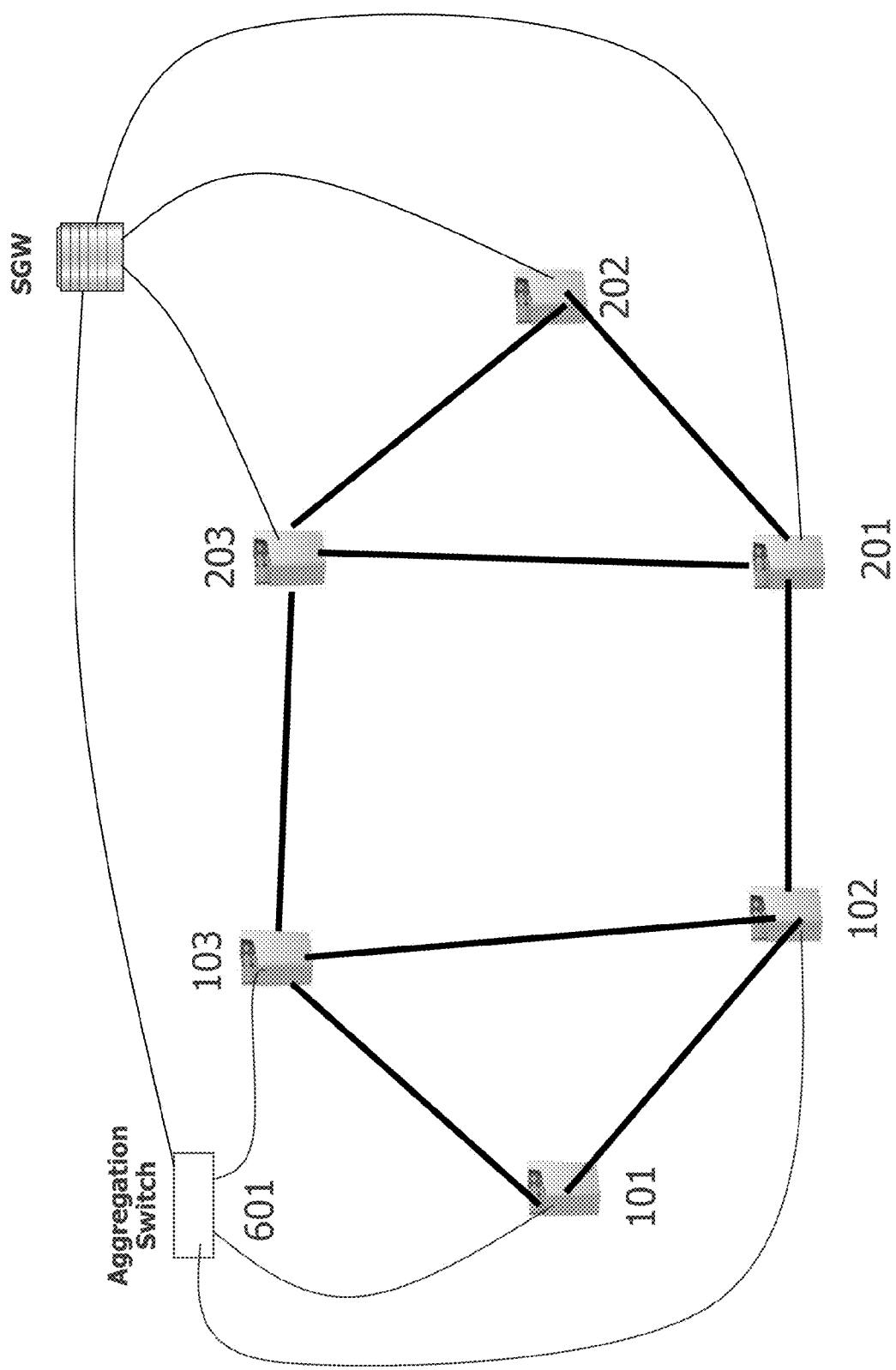
FIG. 5 is a high-level block diagram illustrating an embodiment according to the principles invention that utilizes a fully decentralized architecture.

FIG. 5 is a high-level block diagram illustrating an embodiment according to the principles of the invention that utilizes a fully decentralized architecture. In this case, there is no centralized controller. The transceivers can be either connected directly to a gateway (SGW) (as in the example of transceivers 201, 202, 203) or can be connected first to an aggregation switch 601, which is then connected to a gateway (SGW) (as in the example of transceivers 101, 102, 103). Each transceiver is responsible for measuring the traffic volume and radio conditions from its coverage area and for exchanging information with other transceivers in its proximity via available interfaces (e.g., via meshed connectivity among transceivers). The operation of decentralized architecture embodiments is further detailed in the description related to FIG. 9.

Figure 6:
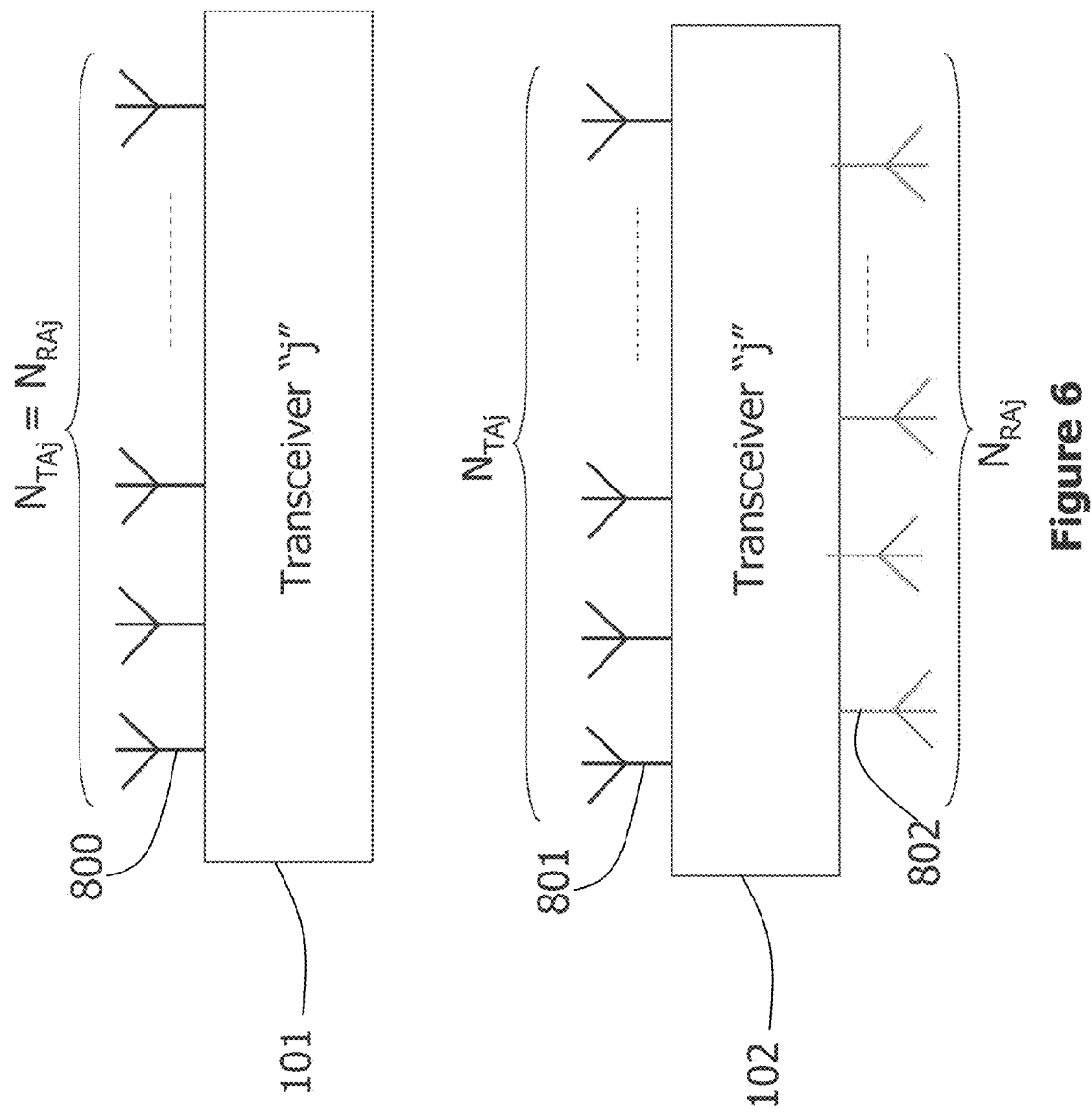
FIG. 6 is a high-level block diagram illustrating example embodiments of transceiver structure according to the principles of the invention.

FIG. 6 is a high-level block diagram illustrating example embodiments of transceiver structure according to the principles of the invention. In one embodiment, the transceiver 101 uses same physical antennas 800 for transmission and reception, and an arbitrary transceiver "j" has a total $N_{TAj}$ antenna ports used for transmission and a total $N_{RAj}$ antenna ports used for reception. Transmission and reception ports may be equal or may be different. In another embodiment, the transceiver 102 uses different physical antennas for transmission 801 and reception 802, and an arbitrary transceiver "j" has a total $N_{T A j}$ antenna ports used for transmission and a total $N_{R A j}$ antenna ports used for reception. Transmission and reception ports may be equal or may be different.

Figure 7:
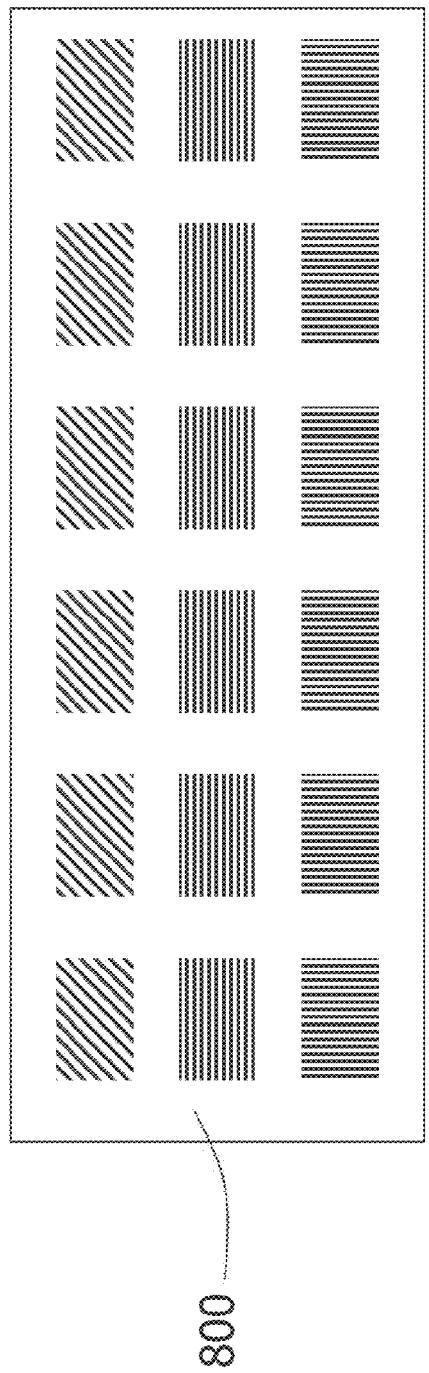
FIG. 7 is a high-level block diagram of an example embodiment of an antenna using an Active Antenna Array (AAA) structure according to the principles of the invention.

FIG. 7 is a high-level block diagram of an example embodiment of an antenna using an Active Antenna Array (AAA) structure according to the principles of the invention. The antenna 800 of an arbitrary transceiver "j" has a number of active elements $N_{T E j}$ used to form radiating patterns for transmission and a number of active elements $N_{R E j}$ used to form radiating patterns for reception. These antenna elements can be either common for both transmission and reception (diagonal hashing), or can be used for transmission only (horizontal hashing), or can be used for reception only (vertical hashing).

FIG. 8 is a flowchart illustrating an example method of controlling wireless communication elements that is associated with a controller of the centralized architecture embodiment of FIG. 3. After initializing the system, at Step 1 the controller receives and analyzes system information (e.g., measured traffic activity, resources usage, measured radio conditions, and the like, etc.) from the N transceivers under its supervision. Each arbitrary transceiver "j" has $N_{T A j}$ transmitting antenna ports & $N_{T E j}$ transmitting antenna elements and $N_{R A j}$ receiving antenna ports & $N_{R E j}$ receiving antenna elements.

At each time step, T, where T is a system parameter (time increments of T), in Step 2, based on traffic conditions and/or radio conditions, the controller determines the desirable system configuration, and generates instructions such that the following actions are taken in the system:

Assuming "t" is the current system time:

1) determine N(t) transceivers that are to be activated, where N(t)<=N;

There is a direct dependency between a measured traffic volume and a suitable number of transceivers needed to accommodate that traffic. Hence, in one embodiment, a number of transceivers suitable to accommodate traffic within a certain volume range are placed in an active state. This may involve moving a transceiver from and the active state to an inactive state and vice versa or maintaining the current state of any particular transceiver. For example, assuming a set of traffic volume thresholds $\{TV_1, TV_2, TV_3, \ldots, TV_N\}$, a set of transceivers $\{NT_1, NT_2, NT_3, \ldots NT_{N-1}\}$ can be used to accommodate the traffic, where $NT_j$ is the suitable number of transceivers for any traffic volumes between $TV_j$ and $TV_{j+1}$. Such a mapping can be predetermined and may be based on predicted performance levels and/or may be based on learning from (previous) field measurements (if available). For instance, having as reference the same type of antenna, suppose sixty-two (62) transceivers can carry out one-thousand-eight-hundred (1,800) 128 kbps video connections simultaneously, while one-hundred-twenty-four (124) transceivers can carry out three-thousand-eight-hundred-forty (3,840) 128 kbps video connections simultaneously (see the illustration and description of the example provided with respect to FIG. 15 for a single element antenna case).

Figure 12:
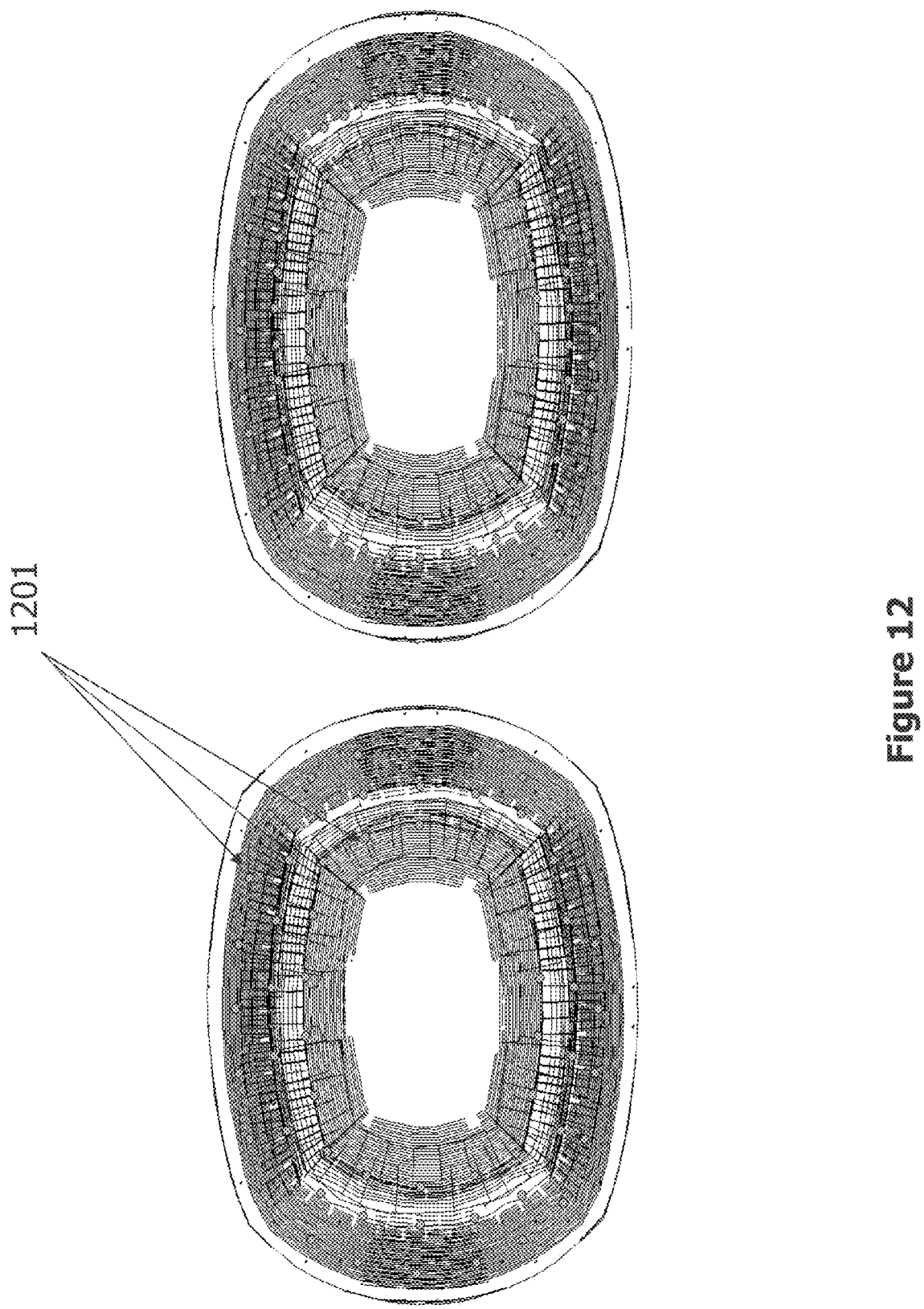
FIG. 12 illustrates two examples of transceiver deployments in a geographical area that corresponds to a stadium.

2) For each active "j" transceiver:

2.a: determine a radiated power level p(j) as well as the azimuth (j) and tilt (j) of the transceiver's antenna;

In this state, the controller knows the current traffic volume and current radio conditions, and how many transceivers are active. Taking as reference a stadium as represented in FIG. 12, a power level as small as 10 mW may be sufficient to provide wireless service for users. In lossier environments, typically associated with the presence of buildings, power levels as high as hundreds of mW may be necessary for provide wireless service. Each transceiver can gradually adapt its reference power level for a given state based on feedback (e.g., Channel Quality Information (CQI) feedback)) received from at least one mobile device. Alternatively, each transceiver can set its reference power level for a given state based on predicted performance levels and/or based on learning from (previous) field measurements.

Figure 13:
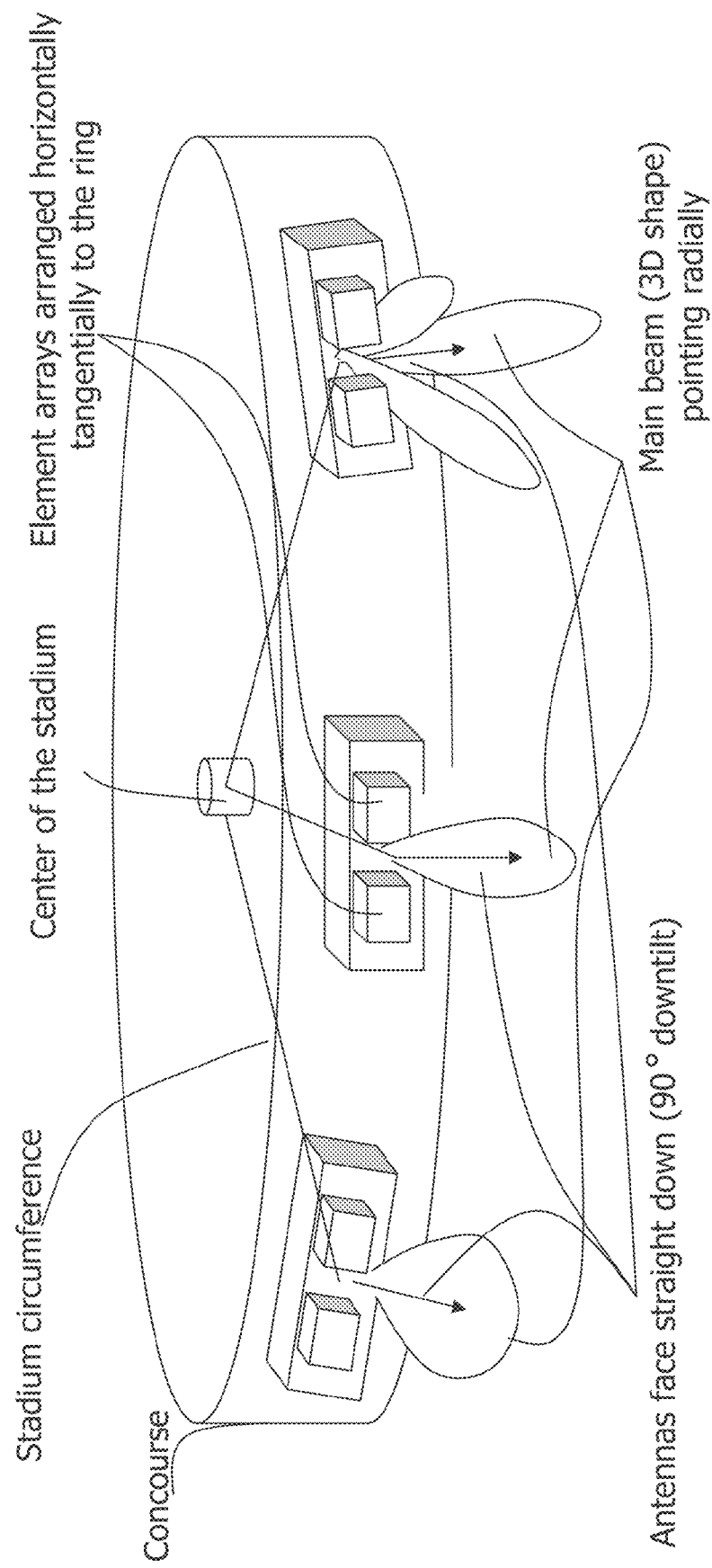
FIG. 13 is an illustration of an example deployment scenario for a stadium in accordance with the principles of this invention.

Furthermore, taking as a reference the stadium as represented in FIG. 12, in one embodiment, transceivers may be deployed as illustrated in FIG. 13 (e.g., tilt and azimuth for the antenna of each transceiver are set accordingly):

Several tiers (i.e., rings parallel to the circumference of the stadium) of transceivers may be used for a typical multi-concourse stadium;

Antennas are deployed facing straight down (i.e., a 90° downtilt) along each ring to minimize interference;

Antenna element arrays are arranged horizontally, aligned tangentially to each ring, with the main beam of a transceiver pointing radially; and A plurality of transceivers are packed into each ring of the stadium such that the main beam of the transceivers will be arranged like spokes in a bicycle wheel.

For other types of deployments, the antenna orientation (i.e., tilt and azimuth) of each transceiver can be determined based on predicted performance levels and/or based on rules of thumb, whenever such rules are available.

2.b: determine resources to be used by the "jth" transceiver (e.g., bandwidth, communication channels, etc., and the like);

The bandwidth usable per transmitter is determined depending on the amount of traffic that needs to be carried. In various embodiments, the total available bandwidth (full carrier reuse) or only a fraction of the total available bandwidth (partial carrier reuse) can be allocated to the "ith" transceiver. This can be achieved by comparing the measured traffic volume against a set of thresholds.

For example, in one embodiment there can be two possible deployments with one-hundred-twenty-four (124) transceivers. A frequency reuse 1 deployment can carry out three-thousand-eight-hundred-forty (3,840) 128 kbps video sessions simultaneously, while a frequency reuse 2 deployment can carry out four-thousand-eight-hundred (4,800) 128 kbps video sessions simultaneously.

In this example, if the traffic demand is such that fewer than four-thousand (4,000) 128 kbps video connections are needed (e.g., three-thousand-eight-hundred-forty (3,840) 128 kbps connections needed), a carrier reuse 1 deployment would be possible. However, if the traffic demand is higher and demands more than four-thousand (4,000) 128 kbps video connections (e.g., four-thousand-eight-hundred (4,800) 128 kbps video connections needed), a carrier reuse 2 deployment could be used to support the traffic requirement.

2.c: activate a set $N_{T A j}(t)$ of transmitting antenna ports and a set $N_{T E j}(t)$ of transmitting antenna elements;

2.d: activate a set $N_{R A j}(t)$ of receiving antenna ports and a set $N_{R E j}(t)$ of receiving antenna elements; and 2.e: for each active antenna element "k", determine amplitude $\alpha(k,t)$ and phase $\phi(k,t)$;

In one embodiment, $N_{T A j}(t)$, $N_{T E j}(t)$, $N_{R A j}(t)$, $N_{R E j}(t)$, as well as $\alpha(k,t)$ and $\phi(k,t)$ for each antenna element, can be determined by comparing the current measured traffic volume against a set of traffic volume thresholds $\{TH_1, TH_2, TH_3, \ldots, TH_M\}$. For any traffic volumes between $TH_i$ and $TH_{i+1}$, $N_{TAj}(t)=N_{TAj}(t,i)$, $N_{TEj}(t)=N_{TEj}(t,i)$, $N_{RAj}(t)=N_{RAj}(t,i)$, $N_{REj}(t)=N_{REj}(t,i)$, and for each antenna element "k" $\alpha(k,t)=\alpha(k,t,i)$ and $\phi(k,t)=\phi(k,t,i)$.

The antenna configuration can be determined either based on predicted performance levels and/or based on learning from (previous) field measurements (if available). For instance, two (2) transmit antenna ports ($N_{TAj}(t)=2$), and two (2) receive antenna ports ($N_{RAj}(t)=2$) can be activated for each of the sixty-two (62) active transceivers. With a single active element per antenna ($N_{TEj}(t)=1$ and $N_{REj}(t)=1$), eighteen-hundred (1,800) 128 kbps simultaneous video connections can be carried out, while with four active elements per antenna ($N_{TEj}(t)=4$ and $N_{REj}(t)=4$), twenty-four-hundred (2,400) 128 kbps simultaneous video connections can be carried out.

Similarly, two (2) transmit antenna ports ($N_{TAj}(t)=2$), and two (2) receive antenna ports ($N_{RAj}(t)=2$) can be activated for each of the one-hundred-twenty-four (124) active transceivers. With a single active element per antenna ($N_{TEj}(t)=1$ and $N_{REj}(t)=1$), 3,840 128 kbps simultaneous video connections can be carried out, while with four active elements per antenna ($N_{TEj}(t)=4$ and $N_{REj}(t)=4$), 4,800 128 kbps simultaneous video connections can be carried out.

In this example, if the traffic demand is such that fewer than two-thousand (2,000) 128 kbps video connections are needed (e.g. eighteen-hundred (1,800) 128 kbps connections needed), a deployment with sixty-two (62) transceivers, each transceiver equipped with two (2) transmit/receive antenna ports, and each antenna having a single active element is sufficient. However, if the traffic demand is higher and demands more than two-thousand (2,000) 128 kbps video connections (e.g., up to twenty-four-hundred (2,400) 128 kbps video connections needed), a deployment with sixty-two (62) transceivers, each transceiver equipped with two (2) transmit/receive antenna ports, and each antenna having four (4) active elements is required. Subsequently, if the traffic demands are between two-thousand-four-hundred (2,400) 128 kbps video connections and three-thousand-eight-hundred-forty (3,840) 128 kbps video connections, a deployment with one-hundred-twenty-four (124) transceivers, each transceiver equipped with two (2) transmit/receive antenna ports, and each antenna having a single element are necessary. If the traffic demands are between three-thousand-eight-hundred-forty (3,840) 128 kbps video connections and four-thousand-eight-hundred (4,800) 128 kbps video connections, a deployment with one-hundred-twenty-four (124) transceivers, each transceiver equipped with two (2) transmit/receive antenna ports, and each antenna having four (4) active elements are required.

The amplitude and the phase of each antenna element can be further determined to steer the beams electronically and to create desirable beam shapes.

The system will stay in this configuration during the next time window "T", before moving back to Step 1.

Figure 9:
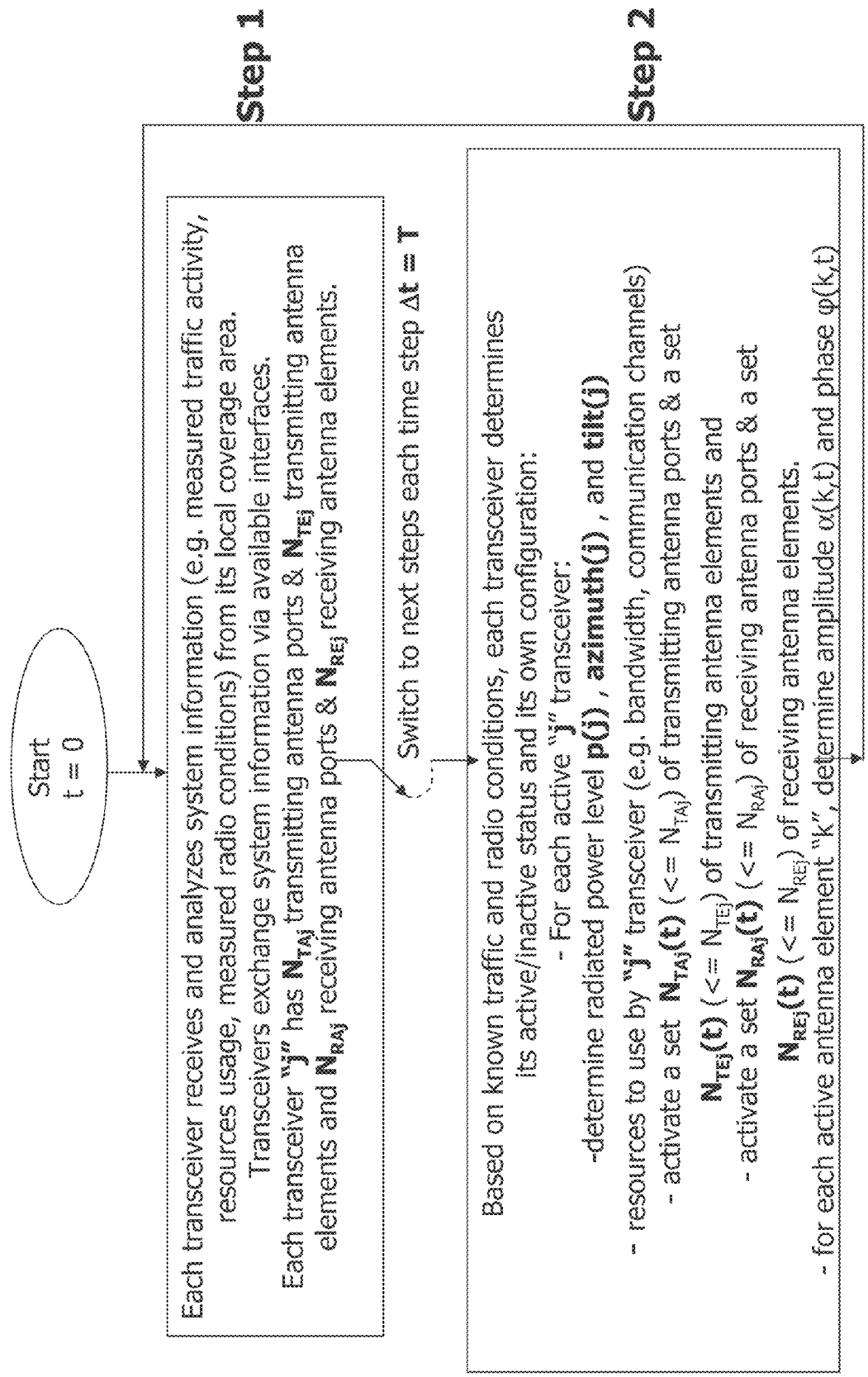
FIG. 9 is a flowchart illustrating an example method of controlling wireless communication elements that is associated the decentralized architecture of FIGS. 4 and 5.

FIG. 9 is a flowchart illustrating an example method of controlling wireless communication elements that is associated the decentralized architecture of FIGS. 4 and 5. After initializing the system, at Step 1, each transceiver receives and analyzes system information (e.g., measured traffic activity, resources usage, measured radio conditions, etc, and the like) from its local coverage area. Transceivers exchange system information via available interfaces. Each arbitrary transceiver "j" has $N_{TAj}$ transmitting antenna ports & $N_{TEj}$ transmitting antenna elements and $N_{RAj}$ receiving antenna ports & $N_{REj}$ receiving antenna elements.

At each time step, T, where T is a system parameter (time increments of T), in Step 2, based on known traffic and radio conditions, each transceiver determines active/inactive status and its own configuration:

Assuming "t" is the current system time:
1) For each active "j" transceiver:
  determines radiated power level p(j), azimuth (j) and tilt (j);
  determines resources to use by the "jth" transceiver (e.g., bandwidth, communication channels, etc., and the like);
  activates a set NTAj(t) of transmitting antenna ports and a set NTEj(t) of transmitting antenna elements;
  activates a set NRAj(t) of receiving antenna ports and a set NREj(t) of receiving antenna elements; and
  for each active antenna element "k", determines amplitude $\alpha(k,t)$ and phase $\phi(k,t)$.

The system will stay in this configuration during the next time window "T", before moving back to Step 1.

Configuration information that is determined by the controller may include one or more of wireless communication element activation status, antenna port activation status, antenna element activation status, design element information, power level setting information, antenna pattern setting information, antenna orientation setting information, and information concerning resources in use by a first wireless communication element. Further examples indicating how a system adapts its configuration according to the principles of this invention are described in the following materials.

Figure 10:
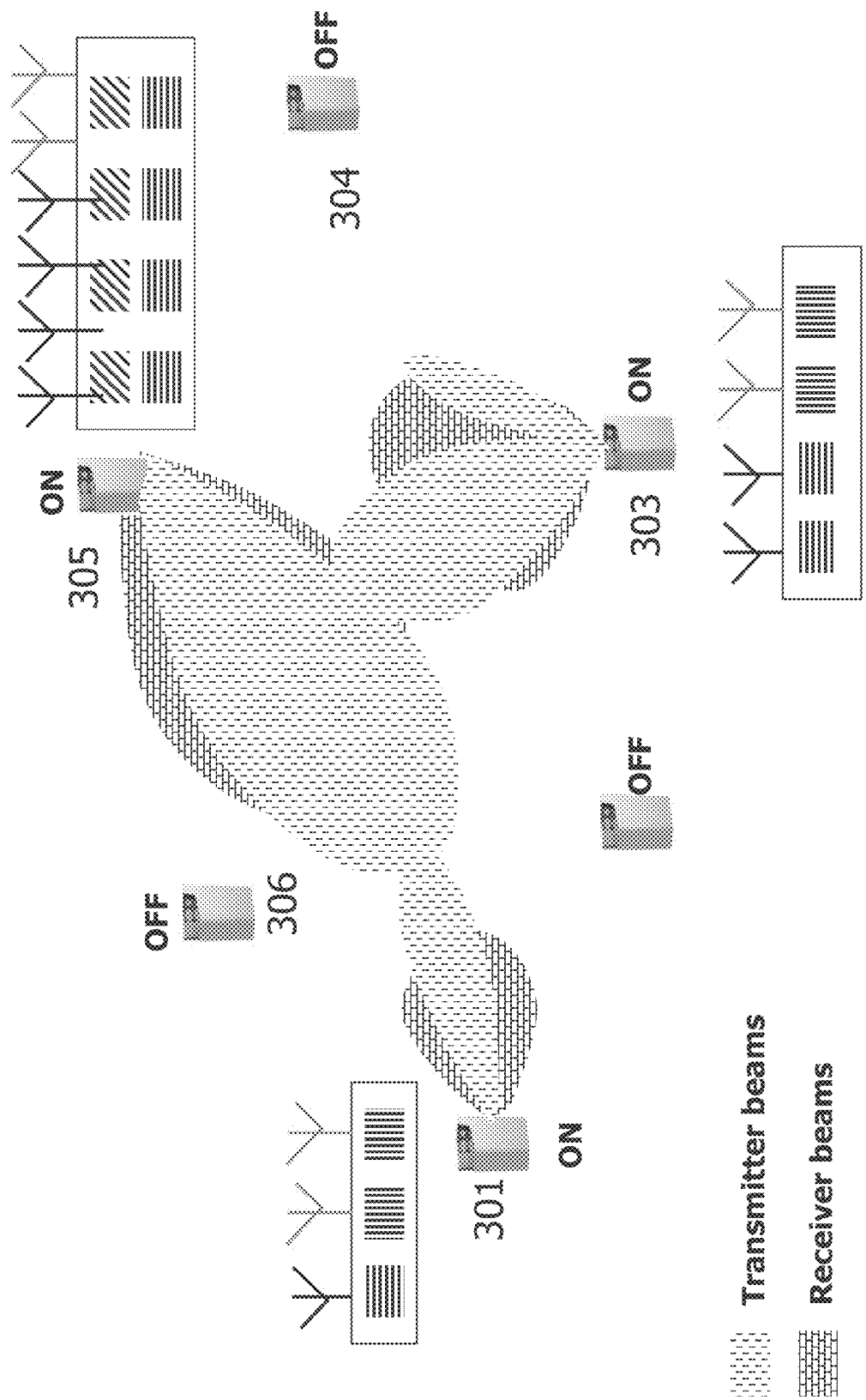
FIG. 10 illustrates a possible wireless system state with respect to a deployment scenario in accordance with the principles of this invention.

FIG. 10 illustrates a possible system state with respect to a deployment scenario in accordance with the principles of this invention. The system includes six (6) transceivers 301, 302, 303, 304, 305, 306. The transceivers provide wireless service to the geographic area of interest (e.g., the space circumscribed by the transceivers) Three (3) transceivers 301, 303 and 305 are activated, while the other three transmitters 302, 304 and 306 are left inactive. Beam patterns are illustrated for transmission (indicated by vertical dashes) and reception for each transceiver, as they can be different in configuration and shape. Beam patterns for transmission for a transceiver are indicated by vertical dashes and beam patterns for reception for a transceiver are indicated by a brick-like pattern.

FIG. 10 also illustrates a possible antenna realization in accordance with the principles of this invention. The transceiver 301 has an antenna port for transmission and two (2) antenna ports for reception, and it uses an active antenna element for transmission (indicated by horizontal hashing in FIG. 10) and two (2) active antenna elements for reception (indicated by vertical hashing in FIG. 10). The transceiver 303 has two (2) antenna ports for transmission and two (2) antenna ports for reception, and it uses two (2) active antenna elements (horizontal hashing) for transmission and two (2) active antenna elements for reception (vertical hashing). The transceiver 305 has four (4) antenna ports for transmission and two (2) antenna ports for reception, and it uses four (4) active antenna elements common for transmission and reception (indicated by diagonal hashing in FIG. 10) and four (4) active antenna elements for transmission only (horizontal hashing).

FIGS. 11.a, 11.b and 11.c illustrate through an example how a wireless communication system designed in accordance to the principles of this invention adapts to changing traffic conditions over the geographic area of interest.

FIG. 11.a represents an example of a transceiver structure used in the system deployment further described in FIGS. 11b and 11.c. Each transceiver has four (4) antennas (which providing four (4) transmitter antenna ports and four (4) receiver antenna ports) and sixteen (16) active antenna elements used for both transmission and reception (boxes indicated by diagonal hashing).

FIG. 11.b shows a system configuration in which, to provide wireless service to a geographic area of interest, each of the transceivers that is active has an antenna pattern that is adapted to serve a traffic density D across the entire service area. Further, of the nine (9) transceivers (301 through 309) that can serve the geographic area of interest, only six (6) transceivers (301 through 306) are in an active state; the remaining transceivers that can serve the geographic area of interest are in an inactive state. Further, to provide desired level of wireless service, for the active transceivers, only two (2) antennas are active and only two (2) antenna elements are fed.

FIG. 11.c shows a system configuration that has been adapted to traffic density corresponding to the system conditions that have changed from FIG. 11.b. In this scenario under consideration, the traffic density has surged in some portions of the geographic area, from D to 2D (i.e., two times more traffic than in FIG. 11.b) and from D to 4D (i.e., four times more traffic than in FIG. 11.b). As a result, all nine (9) transceivers (301 through 309) are set to an active state. Transceivers 301, 302, 303 and 305 still serve portions of the geographic area of interest where the traffic density is D, and they still rely on two (2) antennas and two (2) antenna elements to provide that level of service. Transceivers 304, 307 and 308 serve other portions of the geographic area of interest where the traffic density is 2D. This is the portion of the geographic area of interest that previously was served by the transceiver 304 alone when the traffic density was D in FIG. 11.b. Now, each of three (3) active transceivers (308, 304 and 307) rely on two (2) antennas and eight (8) antenna elements, which are fed intelligently for better interference management, for instance by creating narrower beam patterns.

Similarly, transceiver 306 previously served an area where the traffic density was D in FIG. 11.b, but will not have sufficient capacity to serve alone the same area under the traffic assumptions of FIG. 11.c, where the traffic density surged to 4D. Both of transceivers 306 and 309 are now active, and to accommodate the increasing traffic demand, each relies on four (4) antennas and sixteen (16) antenna elements. With this configuration they can manage intelligently the interference, for instance by creating narrower beam patterns and can support multiple streams of data in parallel through Multiple Input Multiple Output (MIMO) techniques.

In some cases, the number of communication elements that are active can be increased and, while in some cases the number of antenna elements is expected to increase (resulting in narrower antenna pattern for the respective antenna), in some other cases, the number of antenna elements may remain constant or decrease (resulting in broader antenna pattern for the respective antenna). A similar effect may happen when the number of communication elements is decreased (there may not be a corresponding decrease in the number of antenna elements, some wireless communication elements may have their number of antenna elements go down, but some other wireless communication elements may keep their number antenna elements constant, or even may have their number of antenna elements go up).

A wireless communication system designed according to the principles of this invention is able to migrate across different states as described above.

FIG. 12 illustrates two examples of transceiver deployments in a geographical area that corresponds to a stadium. The deployment on the left-hand side of the figure corresponds to a lower density of transceivers (in this instance sixty-two (62) transceivers) while the deployment on the right-hand side of the figure corresponds to a higher density of transceivers (in this instance one-hundred-twenty-four (124) transceivers). Transceivers are represented by dots in FIG. 10. In both deployment cases illustrated, the plurality of transceivers are deployed in multi-tiers (in this instance three (3) tiers), the tiers are rings parallel to the circumference of the stadium, each tier for providing local wireless services to different concourses of a stadium. The number of tiers and number of transceivers may be different for different deployment scenarios.

FIG. 13 is an illustration of an example deployment scenario for a stadium in accordance with the principles of this invention. Several tiers (rings parallel to the circumference of the stadium) of transceivers may be deployed for a typical multi-concourse stadium. In one embodiment, antennas of one or more transceivers are deployed facing straight down (i.e., 90° downtilt) along each ring to minimize interference. Element arrays are arranged horizontally, aligned tangentially to each ring, with the direction of the main beam created by the antenna radiating pattern pointing along the segment linking the location of the antenna to the center of the stadium (i.e., radially). Transceivers are packed into each ring of the stadium like spokes in a wheel.

Element arrays may be arranged tangentially to the circumference (one can imagine such arrays as rectangles though they can be other shapes also) arranged this way (refer to the FIG. 11). Several beams may be generated out of an array of elements. The number of beams and their shapes are determined by the way the arrays are fed, but there is always a main beam. The elements of the arrays are arranged horizontally, the front-face straight down, but the resulting beam yet can be controlled electronically to radiate towards any direction. In one configuration, the main beam of an array is aligned with the radius; that is, the plane of the main axis of the main beam will intersect the plane of the radius that links the center of the array to the center of the geographic area (e.g., stadium). In FIG. 11 illustrating an "example antenna deployment", and also in FIG. 14 which illustrates a "coverage example", the resulting footprint on the "ground", represents the coverage footprint of the resulting radiation pattern.

Figure 14:
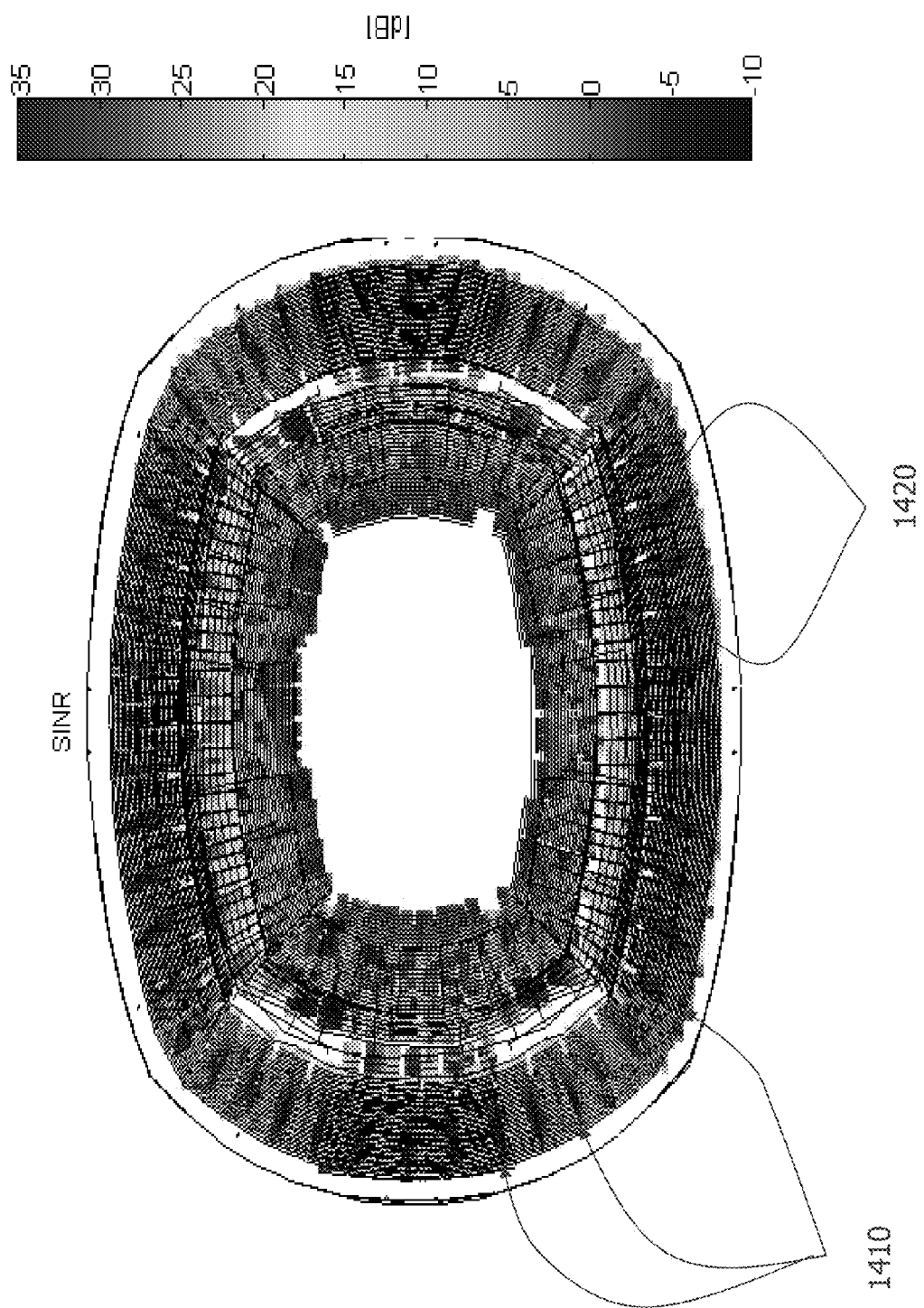
FIG. 14 shows a coverage example for a stadium using one deployment embodiment in accordance with the principles of this invention.

FIG. 14 shows a coverage example for a stadium using one deployment embodiment in accordance with the principles of this invention. The figure illustrates the examples of transceivers locations 1410 and resulting footprint 1420 from the radiating patterns of the transceivers antennas. As is illustrates, the direction of the main beam created by the antenna radiating pattern points along the radius.

Figure 15:
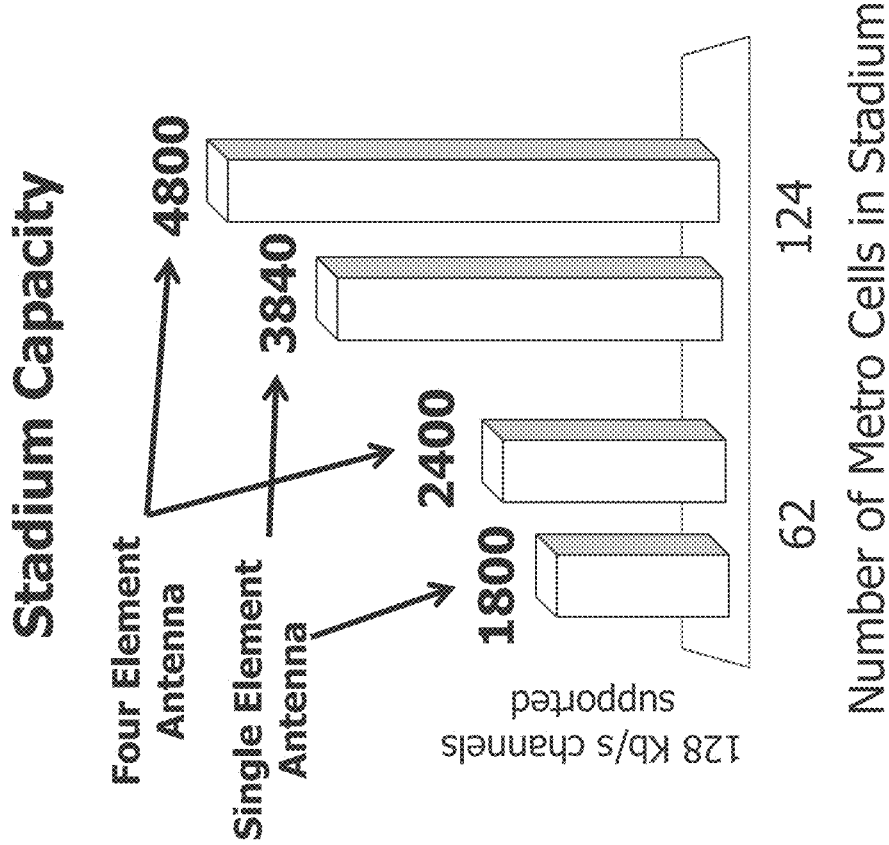
FIG. 15 shows a capacity example for an example stadium deployment.

FIG. 15 shows a capacity example for an example stadium deployment. The histograms indicate the number of simultaneous 128 kbps video connections that can be offered with sixty-two (62) and one-hundred-twenty-four (124) metro cells deployed as in FIG. 14, with antennas using either one (1) or four (4) elements.

FIGS. 16a and 16b show a frequency reuse example for an example stadium deployment. The figure represents the achievable capacity with sixty-two (62) metrocells deployed as in FIG. 14 with frequency reuse 1 and frequency reuse 2. The enhancement in radio conditions in favor of a frequency reuse 2 deployment in this case is obvious by contrasting the two coverage maps in FIG. 16 which show increased SINR for the beams provide by the metrocells. This is at the basis of achieving higher capacity with a frequency reuse 2 deployment for this case.

RF carrier reuse can be RF carrier reuse N, where N can theoretically be any integer number. Practical options currently limit the availability to N=1 (1×10 MHz), 2 (2×5 MHz), 3 (3×3 MHz), 6 (6×1.4 MHz) in LTE for 10 MHz spectrum. For LTE 5 MHZ spectrum only N=1 (1×5 MHz) and N=3 (3×1.4 MHz) are possible currently. For LTE 20 MHz spectrum, the only options currently available are N=1 (1×20 MHz), N=2 (2×10 MHz), N=4 (4×5 MHz), N=6 (6×3 MHz), and 12 (12×1.4 MHz).

Figure 17:
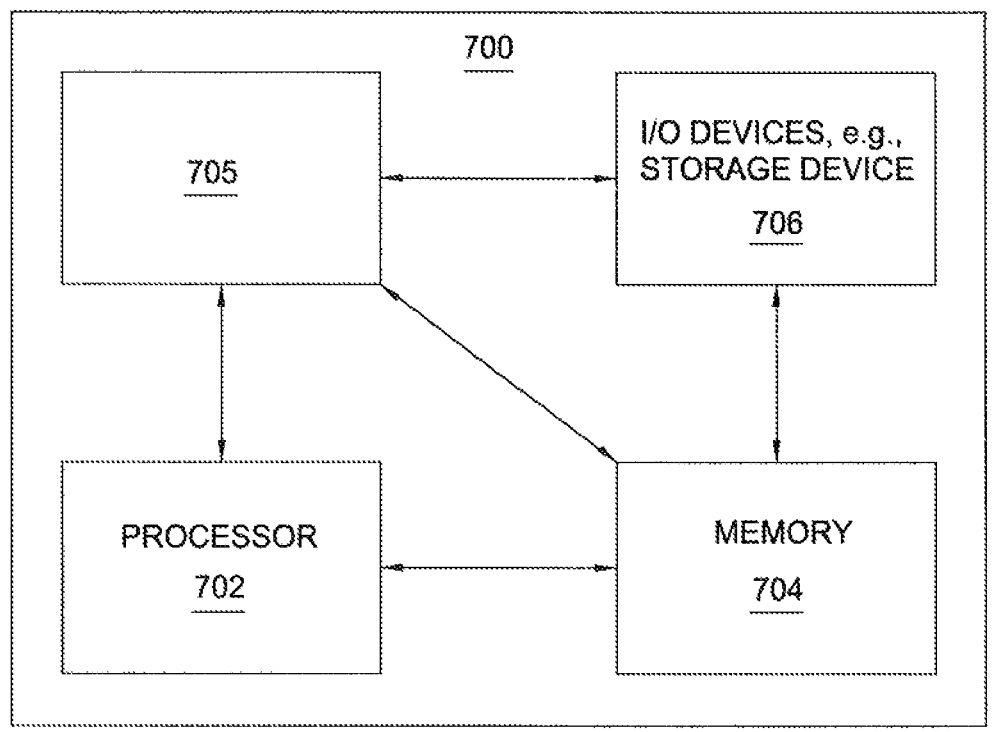
FIG. 17 depicts a high-level block diagram of a computer suitable for use in performing functions described herein.

FIG. 17 depicts a high-level block diagram of a computer suitable for use in performing functions described herein. As depicted in FIG. 17, computer 700 includes a processor element 702 (e.g., a central processing unit (CPU) and/or other suitable processor(s)) and a memory 704 (e.g., random access memory (RAM), read only memory (ROM), and the like). The computer 700 also may include a cooperating module/process 705 and/or various input/output devices 706 (e.g., one or more of a user input device (such as a keyboard, a keypad, a mouse, and the like), a user output device (such as a display, a speaker, and the like), an input port, an output port, a receiver, a transmitter, and a storage device (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 705 can be loaded into memory 704 and executed by the processor 702 to implement functions as discussed herein. Thus, cooperating process 705 (including associated data structures) can be stored on a computer readable storage medium, e.g., RAM memory, magnetic or optical drive or diskette, and the like.

It will be appreciated that computer 700 depicted in FIG. 17 provides a general architecture and functionality suitable for implementing functional elements described herein and/or portions of functional elements described herein. For example, the computer 700 provides a general architecture and functionality suitable for implementing one or more of a portion of wireless communication element, transceiver, transmitters, receiver, controller, user device, any of the cellular network elements, SGW, PGW, Aggregation Switch, SeGW, SGSN, GGSN, a wireless communication element or portion thereof, a transmitter, a receiver, transceiver, a controller and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flowcharts, flow diagrams, state transition diagrams, pseudo code, and the like represent various processes which may be substantially represented in computer readable medium and so executed by a computer or processor, whether or not such computer or processor is explicitly shown.

The invention claimed is:

1. A system comprising:
a plurality of wireless communication elements for providing wireless service to a geographic area of interest, each wireless communication element comprising at least an antenna port and at least one antenna, one or more of the plurality of wireless communication elements including a plurality of antenna ports; and
a controller for controlling the wireless communication elements, wherein the controller is configured to determine respective ones of the wireless communication elements that are to be activated or not activated; and
wherein the controller is configured to determine respective ones of the plurality of antenna ports of a respective wireless communication element that are to be activated or not activated;
wherein one or more of the plurality of wireless communication elements includes a plurality of antennas; and
wherein the plurality of antennas of at least one of the plurality of wireless communication elements are arrayed horizontally and aligned tangentially to a tier of wireless communication elements around a periphery of a circumference of the geographic area of interest, with a main beam of one or more of the wireless communication elements configured to point along a radius to an interior of a space defined by the plurality of wireless communication elements.

2. The system of claim 1 wherein the wireless communication elements are transmitters, receivers, or transceivers.

3. The system of claim 1 wherein the controller is configured to determine the respective ones of the wireless communication elements that are to be activated or not activated based on traffic density of the geographic area of interest.

4. The system of claim 1 wherein:
the at least one antenna port of one or more of the plurality of wireless communication elements includes at least one antenna element; and
the controller is configured to determine respective ones of the at least one antenna element of a respective wireless communication element that are to be activated or not activated.

5. The system of claim 1 wherein the controller is configured to change an activation state of at least one of a number of wireless communication elements, a number of antenna ports, a number of antenna elements, or a combination thereof when the controller determines a change in traffic density of the geographic area of interest.

6. The system of claim 1 wherein the controller is configured to change from an inactive state to an active state at least one of a number of wireless communication elements, a number of antenna ports, a number of antenna elements, or a combination thereof when the controller determines a change in traffic density of the geographic area of interest.

7. The system of claim 1 wherein the controller is configured to render inactive at least one of a number of communication elements, a number of antenna ports, a number of antenna elements, or a combination thereof when the controller determines a change in traffic density of the geographic area of interest.

8. The system of claim 1 wherein the controller is configured to control of at least one of amplitude and phase of the at least one antenna element of a respective wireless communication element such that the controller is able to adjust a radiating pattern of the wireless communication element.

9. The system of claim 1 wherein the controller is a centralized controller for the plurality of wireless communication elements.

10. The system of claim 1 wherein the controller is a distributed controller with portions of the controller distributed among subsets of the plurality of wireless communication elements, a respective portion of the distributed controller for controlling a respective subset of the plurality of wireless communication elements.

11. The system of claim 1 wherein the controller is configured to coordinate future configuration information for at least one of a subset of the wireless communication elements, a subset of the at least one antenna ports of a respective wireless communication element, a subset of the antenna elements of a respective wireless communication element or a combination thereof based on configuration information for the wireless communication elements in the subset.

12. The system of claim 1 wherein one or more subsets of the plurality of wireless communication elements are configured to exchange information concerning a configuration for the wireless communication elements within a respective subset.

13. The system of claim 12 wherein the configuration information comprises one or more of wireless communication element activation status, antenna port activation status, antenna element activation status, design element information, power level setting information, antenna pattern setting information, antenna orientation setting information, and information concerning resources in use by a first wireless communication element.

14. The system of claim 1 wherein the plurality of wireless communication elements are configured to utilize mechanisms for mitigating inter-wireless communication element interference.

15. The system of claim 1 wherein the plurality of wireless communication elements are configured to utilize Radio Frequency (RF) carrier reuse for mitigating inter-wireless communication element interference.

16. The system of claim 1 wherein the plurality of wireless communication elements are configured to support at least one of RF carrier reuse 1, RF carrier reuse 2, RF carrier reuse 3, RF carrier reuse 6, and RF carrier reuse 12.

17. The system of claim 1 wherein the plurality of wireless communication elements are configured in one or more tiers around a periphery of a circumference of the geographic area of interest, each tier including a subset of the plurality of wireless communication elements, the wireless communication elements of adjacent tiers separated by a vertical distance.

18. The system of claim 1 wherein a front face of the at least one antenna of at least one of the plurality of wireless communication elements is deployed facing approximately straight down to the earth.

19. The system of claim 1 wherein a front face of the at least one antenna of at least one of the plurality of wireless communication elements is deployed with an approximately 90° down tilt to the horizontal.

* * * * *